(12) United States Patent
Park

(10) Patent No.: US 8,973,908 B2
(45) Date of Patent: Mar. 10, 2015

(54) STRING-THICK-PLATES PACK FOR USE IN COOLING TOWER AND FABRICATION THEREOF

(75) Inventor: Chong Mook Park, Annandale, VA (US)

(73) Assignee: Chong Mook Park, Fairfax, VA (US)

( * ) Notice: Subject to any disclaimer, the term of this patent is extended or adjusted under 35 U.S.C. 154(b) by 1013 days.

(21) Appl. No.: 13/053,382

(22) Filed: Mar. 22, 2011

(65) Prior Publication Data

US 2012/0241988 A1    Sep. 27, 2012

(51) Int. Cl.
*B01F 3/04* (2006.01)
*F28C 1/00* (2006.01)
*F28F 25/08* (2006.01)

(52) U.S. Cl.
CPC ............... *F28C 1/00* (2013.01); *F28F 25/087* (2013.01); *Y10S 261/11* (2013.01)
USPC ................................ 261/112.1; 261/DIG. 11

(58) Field of Classification Search
CPC ....... F28C 1/00; F28C 2001/00; F28F 25/087
USPC ............................ 261/97, 99, 112.1, DIG. 11
See application file for complete search history.

(56) References Cited

U.S. PATENT DOCUMENTS

| | | | |
|---|---|---|---|
| 2,907,404 A * | 10/1959 | Mare | 261/111 |
| 3,416,775 A * | 12/1968 | Szucs et al. | 261/112.1 |
| 3,493,219 A * | 2/1970 | Stachowiak et al. | 261/103 |
| 3,748,828 A * | 7/1973 | Lefebvre | 95/64 |
| 3,823,925 A * | 7/1974 | Balan | 261/98 |
| 3,898,922 A * | 8/1975 | Savage | 454/49 |
| 4,224,257 A * | 9/1980 | Robinson | 261/23.1 |
| 4,762,650 A * | 8/1988 | Bosman | 261/100 |
| 4,980,098 A * | 12/1990 | Connery | 261/112.1 |
| 5,893,410 A * | 4/1999 | Halbrook | 165/118 |

FOREIGN PATENT DOCUMENTS

WO    WO 2005/008159 A1 *    1/2005

* cited by examiner

*Primary Examiner* — Charles Bushey

(57) ABSTRACT

The present invention relates to a fabrication of rectangular shape string-thick-plate and square columnar string-thick-plate pack fabricated by joining a multiplicity of string-thick-plates for use as fill media in cooling towers. The string-thick-plate consists of two vertical-string-screens, on both sides of plate, fabricated by winding one long string over semicircular holes on the top and bottom frames of the string-thick-plate. Intervals between adjacent strings of the vertical-string-screens are designed to preserve a maximum optimized surface area of the strings being able to obtain a maximum cooling efficiency of the string-thick-plate pack. The string-thick-plates are designed to be assembled into upright and tilted string-thick-plate packs, which are installed uprightly and slantly in cross- and counter-current cooling towers, respectively. The string-thick-plates of the present invention tremendously reduce the fabrication cost of a large square columnar string fill pack in one structure.

10 Claims, 7 Drawing Sheets

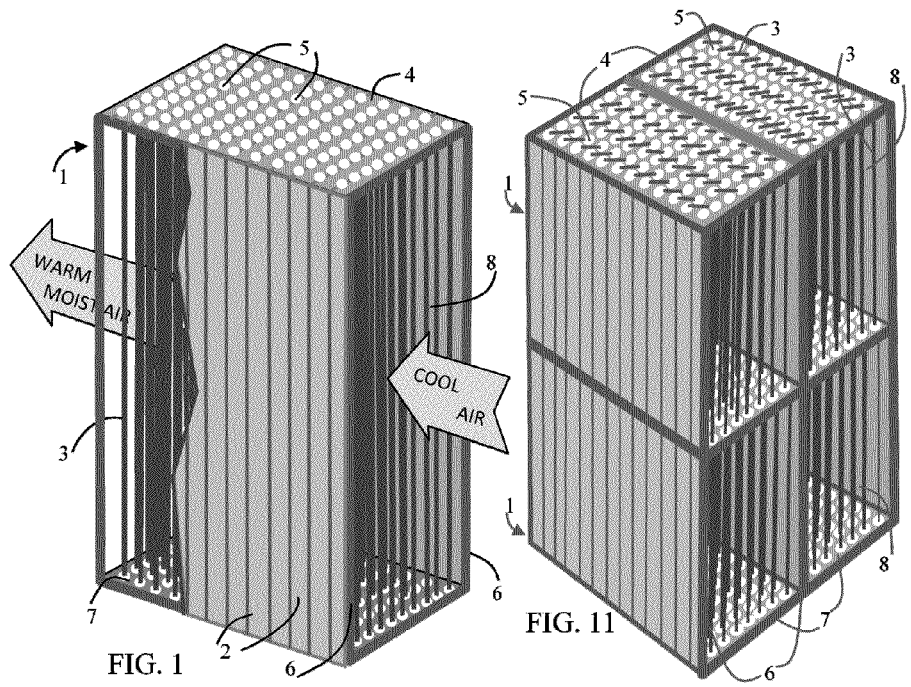
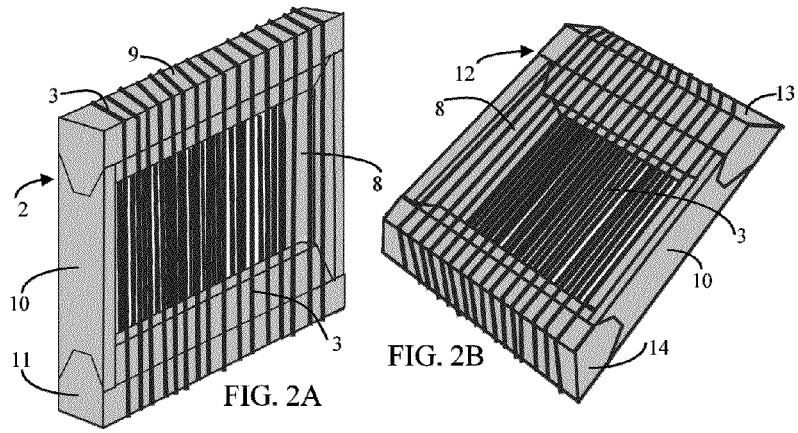

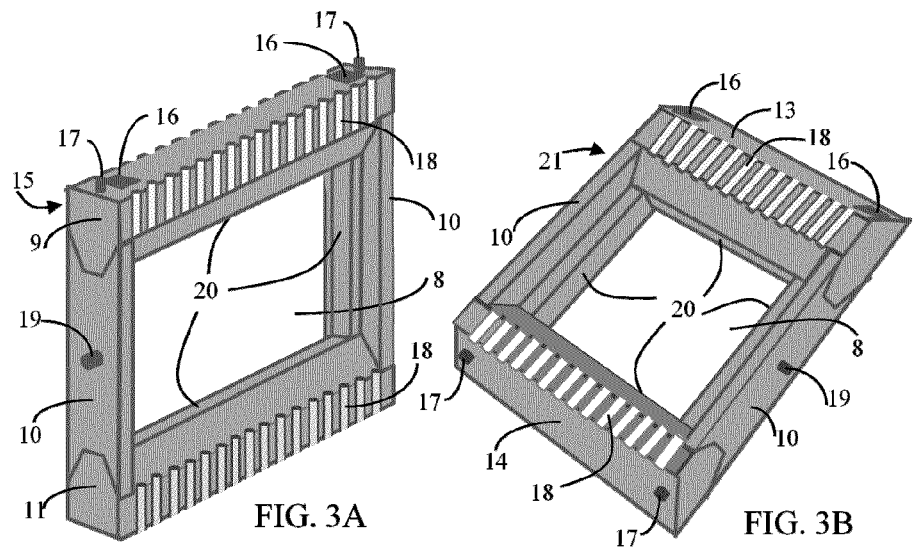
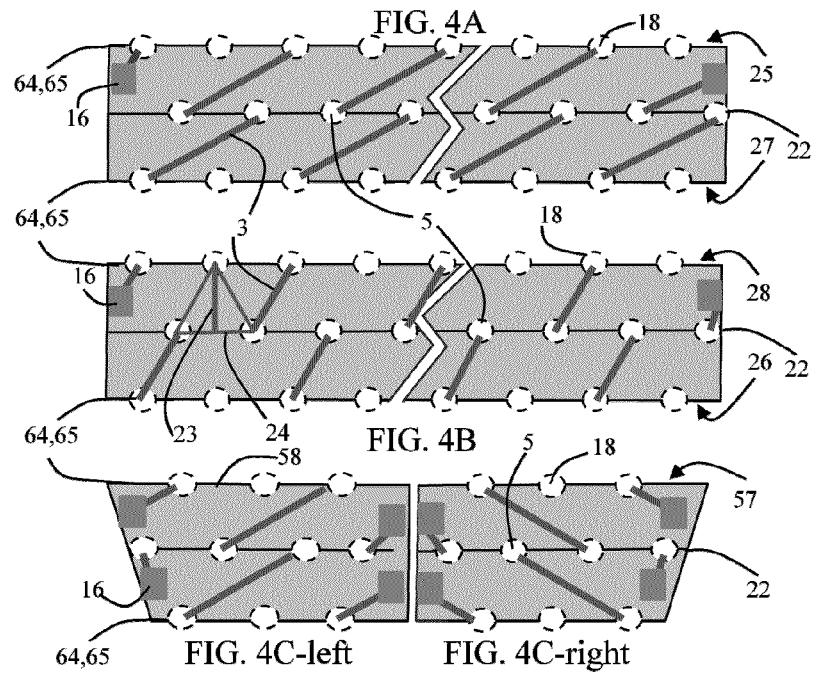

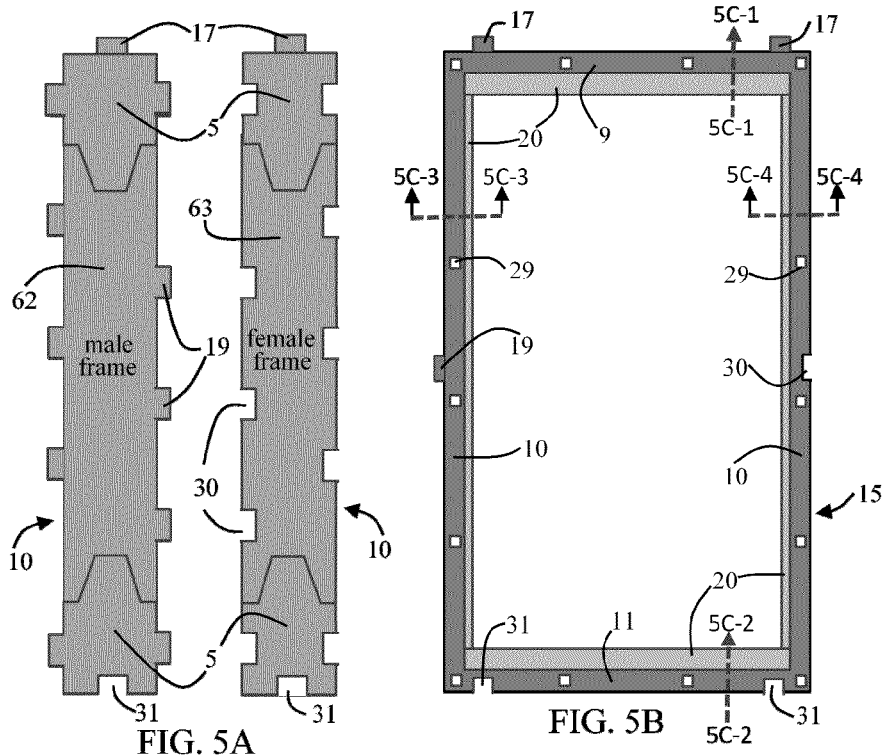
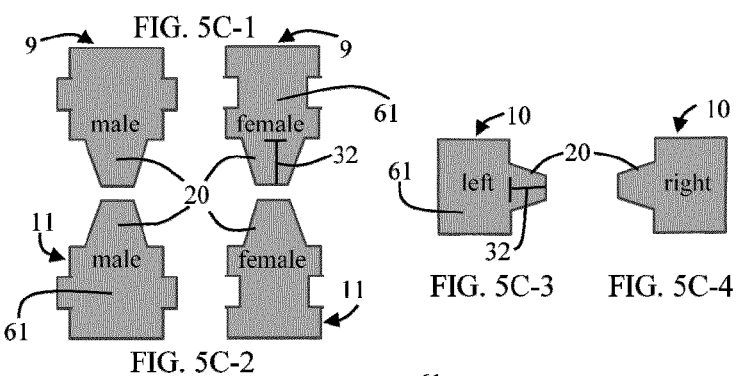
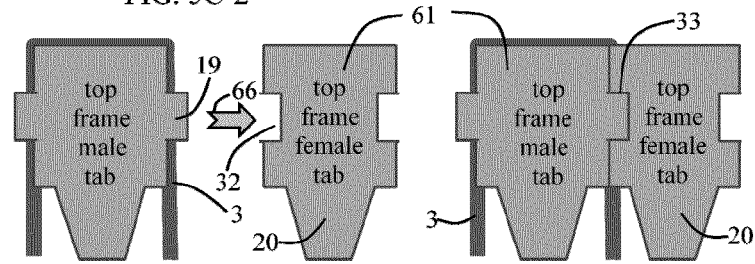
FIG. 6A            FIG. 6B

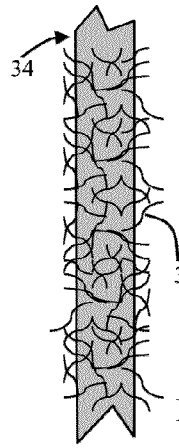
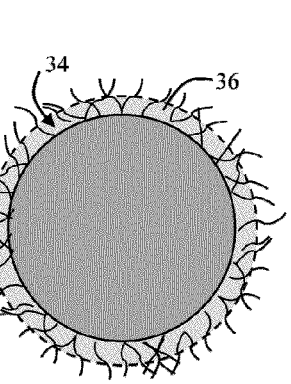
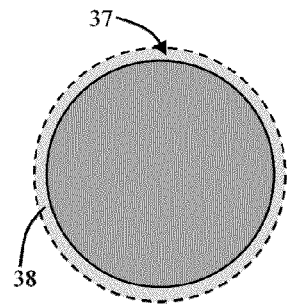
FIG. 7A     FIG. 7B     FIG. 7C
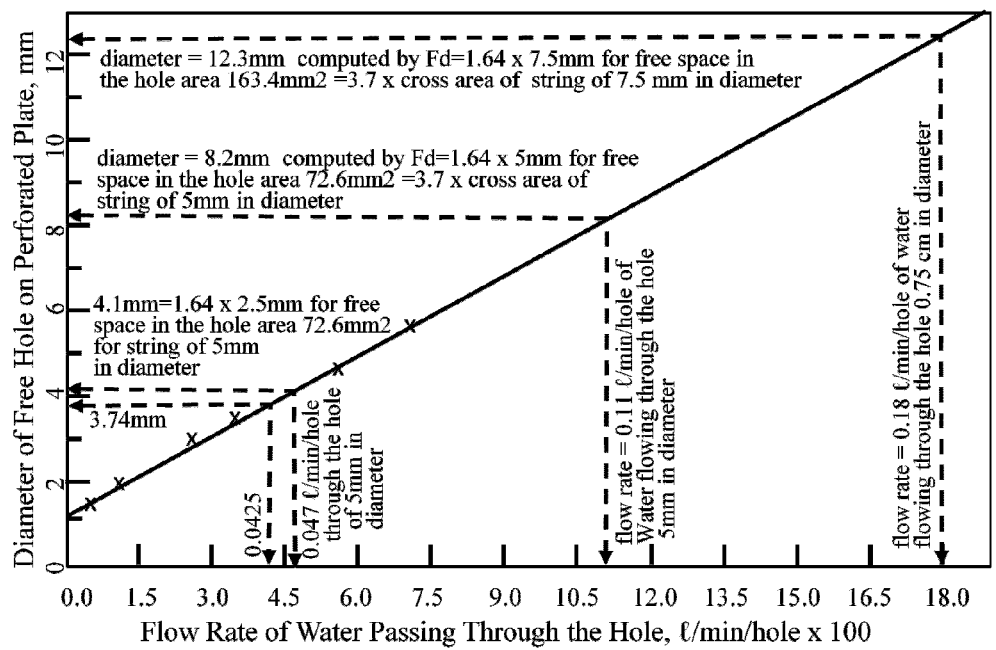
FIG. 8

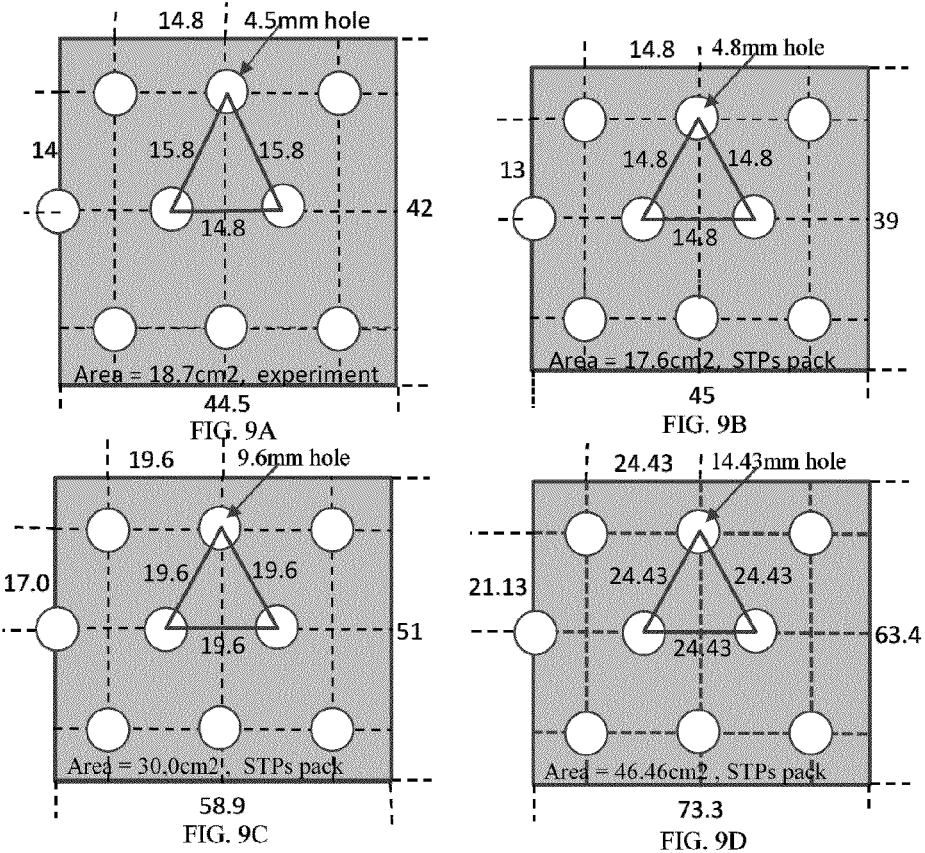
FIG. 9A
FIG. 9B
FIG. 9C
FIG. 9D
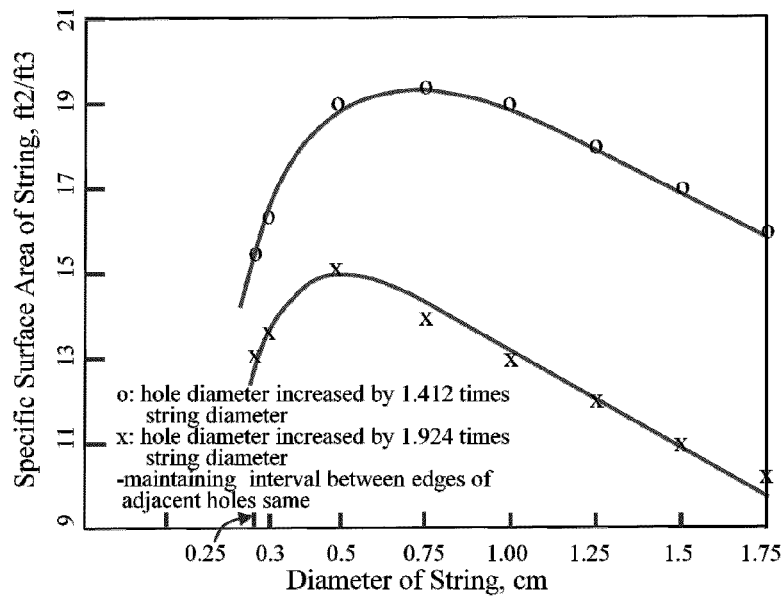
FIG. 10

STRING-THICK-PLATES PACK FOR USE IN COOLING TOWER AND FABRICATION THEREOF

CROSS-REFERENCE TO RELATED APPLICATION

References Cited

U.S. Patent Documents

U.S. Pat. No. 6,517,058 B1 Feb. 11, 2003 Engh et al.
U.S. Pat. No. 6,715,740 B2 Apr. 6, 2004 Engh, et al.

Foreign Patent Documents

| KR | 100393126 | Jul. 18, 2003 | Park |
| KR | 100516391 | Sep. 14, 2005 | Park |
| KR | 100516392 | Sep. 14, 2005 | Park |
| PCT | WO 2005/008159 A1 | Jan. 27, 2005 | Park |

Other Publications http://www.kimre.com/contact_us/AccuPac.pdf, Kimre: ACC-PAC Mist Eliminators,
http://www.process-vooling.com/copyright/bf9b3bbf7a5b7010VgnVCM'00000f932a8c0, Tower performance, Inc.'s Film Fills-C.E. Shepherd Company,

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates to cooling towers utilizing fill media. More precisely, the present invention relates to plate type string fill, String-Thick-Plate, being able to be used in open loop cooling towers, which is fabricated with strings, using the unique characteristics of string: flowing down of water on the surface of the vertical or slanted string by gravity, surface tension of string strong enough to hold the water on the surface of string against the strength of draughts in cooling towers, and capability of contacting water and cooling air with barely resisting air flowing.

2. Description of the Related Art

The cooling tower is a key apparatus to prevent industrial hot temperature equipments such as metal melting crucible, extruder, hot sintering electric furnace, etc, as well as a building air conditioning system from breaking down by heat overload. Such cooling towers are categorized into open loop and closed loop cooling towers. The open loop cooling towers related to the present invention use fill medium which is a fill packs fabricated by assembling rectangular thin PVC or Polypropylene film fills by spacing 1.27 to 5.08 cm. Such a film fill pack is an evaporative heat exchanger having a water cooling function by direct contacting water to be cooled and cooling air on the surface of the film fills. The water to be cooled is sprayed on the top of the film fill packs. When the water is sprayed over the top edge of the film fill packs, quite a bit amount of the water breaks into water droplets such as described in http://www.kimre.com/contact_us/AccuPac.pdf, Kimre: ACC-PAC Mist Eliminators. Small droplets of 1-14 μm in diameter flow upward along with cooling airstream, but large droplets of larger than 14 μm in diameter fall free between the film fills. The rest of water flows down over the surface of the film fills by gravity. When the water flowing down on the surface of the film fills is transferred onto the next film fill packs just below the previous film fill packs, some of the water also falls free between the film fills and the rest of the water continuously flows over the surface of the film fills.

The water flowing down on the surface contacts with the cooling air entering the cooling tower from the outside of the cooling tower and traveling over and through the film fills by a fan blower on the top of the cooling tower. Then, after passing through the film fill packs, the air travels out of the cooling tower through the fan blower. While the water and cooling air are passing through the film fill packs, the water transfers some of its preserving heat in it into the cooling air by evaporation and convection process, resulting in cooling the water. And some of the water droplets falling free are combined with the water flowing down on the surface of the film fills to be cooled, but some of them are not. The droplets falling free may not be cooled enough because their contacting time with the cooling air is not long enough due to their fast dropping. There are two ways of contacting the water and cooling air. One of them is a cross current method using a cross current fill packs in which the water flowing down over the surface of the film fills contacts with ambient cooling air traveling in the direction traversing to the descent of the water and the other is a counter current method using a counter current fill packs over which the water flowing down on the film fills contacts with cooling air traveling upwards through the film fill packs.

The water entering the top of the film fills pack in those cooling towers cannot uniformly flow down on the surface of the film fills because the water is directly supplied without passing through a uniform distributor of water. Namely, a large amount of water flows down on some part of the film fills. Owing to such a supplying pattern of water to the cooling towers, the entire surface of the film fills is not perfectly used for cooling the water, which is one of significant disadvantages of the PVC film fills. Another disadvantage is that the air traveling between the plate fills may not affect enough to cool the water on the plate surface because a large portion of the air may be sliding on the surface without interacting with the plate, namely, not contacting with water. To reduce the passing of the air without contacting with the water, the corrugated shape fills and a great number of spacers are employed. Such means may have more chances to resist and block air flowing or create scales and fouling around the corrugated spot and spacers due to creation of the eddy current flow of the water instead of creating contacting surface area. In other words, attachment of spacer between the film fills to maintain their separations and to provide adequate structural support, and production of corrugated shapes to provide adequate strength and rigidity obviously create a large surface area, but it cannot be escaped of those methods to tremendously reduce the cooling effect of water flowing down over the film fills.

The PVC film fills packs used in cooling towers are fabricated assembling a plurality of PVC film fills by gluing attachment tabs on the film fill as described in U.S. Pat. No.

6,715,740 B2. Usually, more than 4,000 bonding tabs to join the PVC film fills together are used in a typical PVC film fills pack of 60.96×30.48×182.88 cm, see more detailed information in http://www.process-vooling.com/copyright/bf9b3bbf7a5b7010VgnVCM'00000f932a8c0, Tower performance, Inc.'s Film Fills-C.E. Shepherd Company, and to make the PVC film fills pack rigid, asbestos-cement or fibrous cement plastic plates are inserted in the PVC film fills pack. Other packing techniques are well summarized in U.S. Pat. No. 6,715,740 B2 and several disadvantages of a PVC film fills pack are extensively described in U.S. Pat. No. 6,715,740 B2 and the most significant disadvantages of the currently using PVC film fills packs are summarized as follows.

1. The asbestos-cement or fibrous cement plates used in the film fills pack absorb significant amount of water when in service to cause in freeze-thaw damage. As results of this, the useful service life of 100 the fills pack tremendously decreases. And also those plates are heavy, high in cost, and hazardous in disposal.

2. The thick spacers or attachment tabs between the PVC film fills to maintain their separation and provide adequate structural support also resist the flowing of cooling air between the PVC film fills, which causes to decrease the cooling efficiency of the film fills pack.

3. Assembling of adjacent film fills into fills pack is accomplished by using attachment tabs formed on the surface of the film fills. When water is passing down around the spacers of attachment tabs, the flowing rate of water on the underneath of the spacers is relatively so low that scales or fouling are created on those spots. And on the back side of the attachment tabs, concave surfaces are also generated due to production of the attachment tabs so that scales and fouling are created on the 110 concave surfaces. Once the scales and fouling are created, they are growing very fast to resist traveling of the air through the PVC film fills and consequently to reduce the service life of the PVC fill packs.

Such disadvantages of the PVC film fills pack described above are related with the current conventional cooling tower PVC fills pack. The PVC fills packs recently invented such as described in U.S. Pat. No. 6,715,740 B2 for improvement of the current PVC fills packs by compensating their drawbacks also uses the deformable rods or tubes to securely hold the multiple PVC film fills pack in position in the final assembly. They have interior ribs on the surface of the PVC film fills instead of the attachment tabs for maintaining the PVC film fill rigid and strong. At the underneath of the rods or tubes, therefore, the creation of the same scales and fouling cannot be escaped as created at the underneath of attachment tabs in the conventional PVC film fills pack. The interior ribs formed on the surface of the PVC film fills may create an eddy current of water at the corners of the interior ribs to produce scales and fouling on the corners of the ribs. The building up of the scales and fouling reduces flowing rate of the air and finally blocks the air flowing to damage the PVC fills pack. Another disadvantage of the invented technology may be the piling method of the PVC film fills pack in cross stacked fashion. In case of such a piling of the PVC film fills packs, the water flowing down from the previous fills pack may fall free in the air space between the adjacent PVC film fills instead of continuous flowing down on the surface of the PVC film fill, resulting in decreasing the water cooling efficiency of the PVC fills pack.

The evaporative water cooling large string fill pack, one-structure-string-fill-pack, was recently patented by the inventor of the present invention, such as described in Korean Patent NO.s 100393126, 100516391, 100516392, and PCT/KR3004/001825, to replace the PVC film fills pack of the cooling towers. They were invented by eliminating the disadvantages the PVC film fills pack of the current cooling towers. The one-structure-string-fill-packs, heat exchanging media, used in the string evaporative water cooling towers are fabricated with polyester strings and comprises one or more one-structure-string-fill-packs in shape of large rectangular column of 50(W)×25(D)×100(H)cm, fabricated with more than several hundreds of strings. Hence, one rectangular one-structure-string-fill-pack requires a long fabrication time due to threading of strings through the holes on the top and bottom plates separated by 100 cm in the column. The fabrication method is described in Korean Patent No. 100393126. Such a manufacturing feature is a significant disadvantage of the patented string evaporative cooling tower to be brought to marketing. Therefore, it is necessary to have invented a new fabrication technology of a one-structure-string-fill-pack able to tremendously reduce its manufacturing time. To achieve this aim, an innovative String-Thick-Plate (STP) is invented to be easily assembled into a large string fill pack, which is in a rectangular frame whose thickness is in the range of 1 to 5 cm with vertical-string-screens (VSS) on both sides of the STP. The fabrication of the STP is described in the detailed description of the present invention.

The water cooling functions and advantages of the rectangular one-structure-string-fill pack previously invented by the inventor of the present invention are briefly described in this section. When the water to be cooled is sprayed on the top perforated plate of the one-structure-string-fill-pack, the sprayed water spreads over the top perforated plate and is imbibed down through the holes by the surface tension of the strings suspending over and through the holes on the top and bottom plates of the one-structure-string-fill-pack, then flowing down on the surface of the strings. The water flowing down on the surface of the strings becomes circumferential thin film water on the circular surface of the string, which can make a contacting area between water and cooling air maximized and also make the water as thin as possible. Such conditions of the water flowing down on the surface of the strings are significant advantages of the strings to provide high water cooling efficiency of the water. And another significant advantage of the string is that the flowing down of water on the surface of strings do not create any conditions of forming scales and fouling on strings, which means no formation of the scales and fouling in the one-structure-string-fill-pack, resulting in no-reduction of the flowing rate of the cooling air and the serve life of the one-structure-string-fill-pack.

The purpose of the present invention is a fabrication of the innovative STP and STPs pack being free of the disadvantages exhibited in the PVC fill media currently in use and replacing them in the cooling towers, and an inventing of a new technology of fabrication of a large string fills pack requiring a much less fabrication efforts and far lower fabrication cost.

SUMMARY OF THE INVENTION

To eliminate the disadvantages of cooling towers currently in use and including cooling towers and string evaporative cooling towers described above, the STP and STPs pack of the present invention are invented and proved to be adequate for their application to the cooling towers, since they have several advantages given as follows.

1. They can be simply fabricated without great efforts.
2. They do not create scales or fouling on its surface.
3. They have a high water cooling efficiency.

4. They are not attacked by any water chemicals because they are made of inert materials like polyester, high density polyethylene, and aluminum (any other materials are possible)
5. Their service lives are more than 25 years.
6. They deploy a large surface area in a relatively small volume, thereby maximizing heat transfer.
7. They can operate at high water temperature in excess of 57° C. (135° F.) without loss of their physical integrity or mechanical strength.
8. They can be of rugged construction with ability to withstand without their damage or loss of shape.
9. They are light weight.
10. Their materials are non-toxic, non-hazardous, and suitable for easy and safe disposal at the end of service life.

<Fabrication of STP and STPs pack> The STPs pack of the present invention is schematically shown in FIG. 1, which is a standard STP pack in a rectangular column for use in a cross current cooling tower. The standard STPs packs are in dimensions of 30.48(W)×30.48(D)×60.96(H) and 60.96(W)×60.96(D)×121.92(H)cm (other dimensions are possible) which are used as basic STPs pack for designing and fabrication of string heat exchangers, fill media, for construction of cooling towers. FIG. 1 shows that inside the STPs pack are many strings tightly suspended through the holes on the top and bottom perforated plates of the STPs pack and the sides of the STPs pack are paneled with side frames of STP frames, and the front and rear sides of the STP pack are open for cooling air to enter the STPs pack and pass through it out under a guiding control of side panels as shown in FIG. 1. When the STPs pack is in serve, the water pumped on the top of the STPs pack is imbibed into the string loaded holes on the top perforated plate by surface tension of wet strings suspended through the holes and then flow down on the surface of the strings. While the water is flowing down on the strings, the water contacts with cooling air transversely traveling through the strings to be cooled.

The fabrication of STP pack of the present invention is accomplished by assembling a plurality of the STPs of the present invention by joining together the adjacent STPs. The STP of the present invention is a rectangular shape string thick plate with two vertical-string-screens (VSSs) on its both sides. The STP consists of rectangular frame whose thickness is in the range of 1 to 5 cm, other dimensions are possible, and strings wound over the top and bottom frames in the longitudinal direction as shown in FIGS. 2A and 2B. The VSS is comprised of several strings vertically suspended over the top and bottom frames separated sufficiently far apart from each other as shown in FIGS. 2A and 2B. FIG. 2A shows the STP used in a cross current cooling towers (CrC-STP), and FIG. 2B in counter current cooling towers (CoC-STP). The CrC-STPs and CoC-STPs of the present invention are assembled into a STPs pack of the present invention which is installed in the cooling towers. Therefore, the STP pack is a standard for a basic fills pack, 30.48(W)×30.48(D)×60.96(H) and 60.96(W)×60.96(D)×121.92(H)cm, necessary to fabricate a large fills packs used for the cooling towers to be constructed for new cooling towers or replacing the fills packs in the current operating cooling towers.

The STPs are fabricated by winding a single long string over the top and bottom frames of the STP rectangular frames, which are shown in FIGS. 3A and 3B. FIGS. 3A and 3B are used for fabrication of the CrC-STP and CoC-STP, respectively. In case of using string of 5 mm in diameter, the small and large standard frames have respectively 16 and 32 semicircular holes of 9.6 mm in diameter on each of their both sides. Their intervals between the centers of the adjacent semi-circular holes are 19.6 mm, other intervals are possible. The CrC-STP and CoC-STP are fabricated by tightly winding a long single string of 5 mm in diameter by 8 or 16 turns passing through the semicircular holes separated by 39.2 mm, on the sides of the top and bottom frames shown in FIGS. 3A and 3B. Hence, the string loaded CrC-STP and CoC-STP are fabricated as shown in FIGS. 2A and 2B, which are pre-standard STPs with one half (8 or 16 strings loaded holes) of total number of strings on the VSS on each side and thickness of 17 mm. When 18 of pre-standard small size CrC-STPs or CoC-STPs are assembled together, a standard CrC-STPs pack or CoC-STPs pack in dimension of 30.48(W)×30.48(D)×60.96(H)cm are produced by completing VSS including 16 strings on both sides of the STP. Their top and bottom views of the standard STPs pack are shown in FIGS. 4A and 4B. FIGS. 4A and 4B show the top and bottom surface views of combining two rectangular STPs. FIGS. 4C-*left* and 4C-right show the left and right top surface views of combing two trapezoidal STPs, respectively. The top and bottom surface thicknesses of the CrC-STP fabricated with strings of 5 mm in diameter are same as 17 mm, while those of the CoC-STP are 25.8 mm and 36.8 mm, respectively, other dimensions are possible. FIG. 4 shows that the combining of two pre-standard STPs makes a perfect STP of 16 and 32 string loaded holes along the joining lines of the top and bottom frames of 30.48 and 60.96 cm long, respectively.

<Fabrication of Frame of the STP> The frames loaded with strings over them should be kept in the rectangular plate shape without changing their original shapes as long as in service life and the strings kept in their original assigned position on the top and bottom frames. And also the rectangular frame should not be significantly bent due to pulling strength of the strings. To meet such requirements, the frame is designed as shown in FIGS. 5C-1, 5C-2, and 5C-3, any other shapes are possible, and fabricated with an aluminum or aluminum alloy or HDPE or polypropylene, any other materials are possible, which meets the requirements given above and easy to be utilized. Not to be bent by any external force, the frames are supplemented by trapezoidal supporters attached on the beneath of top and bottom frames and on the insides of side frames as shown in FIG. 5B, any other structures are possible. The joining together of the pre-standard STPs is accomplished by aligning the male and female attachment tabs on their frames with and inserted into the adjoining pre-standard STP's tabs by pressing them as shown in FIGS. 6A and 6B. The configuration of the male and female attachment tabs on the frame, their locations on the frame, and cross section view of the frame are shown in FIGS. 5A, 5B, 5C-1, 5C-2, and 5C-3. When the STPs packs are stacked up, it is necessary to firmly fix the STPs packs on the top of the STPs pack. To do so, two male and female piling tabs are made respectively on the top and bottom frames of the STP as shown in FIGS. 5A and 5B. There are any other possible methods to combine the STPs, but their assembly method preferred in the present invention can save assembly efforts and cost because of easy assembly like just pressing male and female tabs to create a strong and permanent binding without any gluing as used for packing PVCFs.

<Determination of String Materials and String Type> The string used in the present invention is a polyester string which has excellent physical and chemical properties like high melting temperature, high resistance to most chemicals, high tenacity for stretching and shrinking, and high durability so that the polyester string is suitable for fabrication of STP. The polyester strings used in the present invention are spiral corrugated non-hairy and hairy polyester strings, any other string types are possible. The spiral corrugated string has an effect of water passing length of 5 percent longer than non-corrugated string because of needing longer string by about 5 percent for fabrication of corrugated string, resulting in increasing the cooling effect of the string by that much rate. The hairy string is the string, having a lot of hair on the surface of string, which holds much more water on the surface of the hairy string compared with the amount of water being held on the surface of non-hairy string. The schematic pictures of hairy string and its holding water are shown and compared with non-hairy string in FIG. 7. As can be seen in FIG. 7, the hairy string has a larger surface area for contacting with cooling air because it has thicker water film held surrounding the surface of the hairy string than non-hairy string has. Hence, the water cooling effect of the hairy string is higher than that of the non-hairy string. From the exemplary result of the non-hairy and hairy string, the hairy string has 15% increased water cooling efficiency compared with non-hairy string. Hence, the water cooling efficiency of the spiral hairy string may be straightforwardly expected to be increased by 20 percent compared with that of the plain string with no hair and no spiral gullies on the string surface.

<Determination of Hole Size, Interval between Adjacent Strings, Specific Number of Strings per Unit Cross Section Area of STPs Pack> A smooth and uniform flowing down through all of holes on the perforated plate of the STPs pack without any accumulation of water on the perforated plate is depending on an optimized hole size and optimized specific number of holes per unit area of the perorated plate. The optimized specific number of holes per unit area of the perforated plate depends on a hole size and an interval between the adjacent holes. The size of hole should be large enough for water to smoothly pass through the hole extra open space except the space occupied by string in the hole. However, the extra open space should not be too large, but not too small for the water pumped on the top surface of the STPs pack to uniformly and smoothly pass through entire holes without accumulation of the water on a certain portion of the top surface. A diameter of such a hole can be determined by an experimental computation formula, $Hd=1.924 \times Sd$ where Hd is a diameter (mm) of a string loaded hole and Sd a diameter (mm) of string. The flow rate of water passing through the hole of Hd in diameter can be determined using FIG. 8 and an experimental formula, $Fd=1.64 \times Sd$, where Fd is a diameter (mm) of string free hole: in case of 290 using the string of 5 mm in diameter, the diameter of string loaded hole is 9.62 mm=1.924×5 mm and diameter of string free hole is 8.2 mm=1.64×5 mm. Using the diameter 8.2 mm of string free hole, the optimized flow rate of water passing through one string loaded hole can be read from FIG. 8 to be 0.11 l/min/hole. Then, total optimized flow rate of water passing through the 1 square meter top plate with holes of 9.62 mm in diameter of the STPs pack using string of 5 mm in diameter is 330 l/min=0.11 l/min/hole×9 holes/30 cm² (optimized specific number of holes)×10000 cm².

The optimized specific number of holes per unit cross section area (OSNH) of the STPs pack is determined using interval between the adjacent holes on the top perforated plate of the STPs pack. The interval between the adjacent holes in the STPs pack of the present invention is 10 mm which is determined using the experimental results described in the previous patent (Reference Cited 4) owned by the inventor of the present invention. The interval of 10 mm is fixed (constant) and applied for designing the position of the holes on the frame of any STPs pack of the present invention using any strings in any diameter. The OSNH of the perforated plate in cases of strings 2.5, 5.0, and 7.5 mm in diameter are determined with the help of the constant interval of 10 mm between the edges of the adjacent holes, and compared with experimental results as shown in FIG. 9. FIG. 9 shows that the OSNHs are 9/17.6, 9/30, and 9/46.46 holes/cm² in case of holes of 2.5, 5.0, and 7.5 mm in diameter, respectively. They are computed using experimental formula $Hd=1.924Sd$, $Fd=1.64Sd$ and FIG. 8 by the same way as described above. Comparing the specific number of holes 9/18.7 holes/cm² of the experiment using strings 2.5 mm in diameter with the computed value of 9/17.6 holes/cm², it can be understood that the computation method is acceptable. The usage of the constant interval between the adjacent holes helps the holes to be positioned at the vertexes of the regular triangle as shown in FIG. 9. Such configuration of the holes lining up in zigzag along the direction of the traveling of the cooling air, helps to increase an effect of the contact of cooling air and water on the surface of strings.

<Determination and Variation of Specific Area of STPs Pack Depending on String Diameter> The OSNH of the STPs pack is used for estimation of the specific surface area of strings (SSAS) for contacting of cooling air and water in the STPs pack. The SSAS of the STPs pack can be simply calculated by multiplying the OSNH of the STPs pack and the surface area of one string in it, since the OSNH of STPs pack represents the maximum number of strings in the STPs pack to provide the best conditions of strings for cooling water flowing down on the surface of the strings in the STPs pack. The SSAS of the STPs pack varies as a function of string diameter as shown in FIG. 10. It can be seen from the FIG. 10 that the SSAS of the STPs pack with hole sizes of 1.924 times string diameter of 5 mm has a maximum value at the string diameter of 5 mm and that the maximum value of the SSAS for smaller hole sizes of 1.412 times string diameter occurs at the string of 7.5 mm in diameter. Hence, the STPs pack used for cooling of a relatively high flow rate of water is designed using maximum SSAS of STPs pack fabricated with large holes and to cool a low flow rate of water, maximum SSAS with small size holes is employed. Especially, in case of requiring of high cooling efficiency of water compared with the normal cooling efficiency of water like currently operating cooling towers, maximum SSAS with small holes is used. Consequently, the SSAS of the STPs pack of the present invention using string of 5 mm in diameter is determined to be 15 ft²/ft³, which is much lower than the lowest specific surface area+, 40 ft²/ft³, of the current operating PVCs pack, see specific surface area of the PVCFs packs in http://www.process-vooling.com/copyright/bf9b3bbf7a5b7010VgnVCM'00000f932a8c0, Tower performance, Inc.'s Film Fills-C.E. Shepherd Company, The physical specifications of the STPs pack of the present invention are summarized like a polyester string of 5 mm in diameter, interval of 10 mm between 335 adjacent holes, and hole size of 9.62 mm, but other specifications are possible.

<Determination of Effective Length of String> The cooling tower cannot cool the water down to lower than the temperature of environmental air surrounding the cooling tower. Therefore, the higher water cooling efficiency of the cooling tower fills pack is, the shorter cooling tower fills pack cools the water down to the environmental temperature, which means that the higher cooling efficient fills pack can reduce the height of the cooling tower by the difference between their cooing efficiencies. The results of the performance tests of the PVCFs pack of the current cooling tower and STPs packs of the present invention so as to compare their water cooling efficiencies shows that the cooling efficiency of the STPs pack of the present invent is higher than that of the PVCFs pack by 20 percent which means that the height of the current PVCFs pack cooling tower can be reduced by 20 percent. In case of using hairy strings, the height of the current cooling tower can be reduced by 35 percent.

<Verification of Flying Away of Water from Strings and Determination of Slanting Angle of String> The water flowing down on the surface of the strings may be blown off the strings when exposed to the blowing air much stronger than the surface tension of the string to water. The flowing rate of air starting to make the water flowing down on the strings fall off the strings is 25 $m^3$(883 $ft^3$)/min, which was observed through the conduction of a verification experiment of flying-away of water from the strings due to the strength of air flow forced by fan blower. Comparing this with the air flow of 11 $m^3$(388 $ft^3$)/min employed in the conventional cooling tower, the falling-off of water from the strings cannot be expected when the STPs packs are employed in the cooling towers. In the counter current cooling tower, the strings are installed by being slanted from the vertical direction of the flowing air. The water flowing down on the slanting string tries to gather beneath of the string so that there exists a slant angle of the string at which the water flowing down on the slanted string starts to fall off the string, which was determined to be 40 degree through a simple experiment. However, a little smaller slant angle of 35 degree is employed for a conservative designing of the frame of the CoC-STP.

<Stacking Method of STPs Packs for Replacing PVCFs packs> As shown in FIG. 11, the STPs packs are stacked on the top of the previous STPs packs and then male and female tabs on the bottom of the STPs pack are nested by pressing them into the counterpart tabs on the top and side of the previous STPs packs. Stacking method of the STPs packs combining by press-joining the male and female attachment or piling tabs makes the balance of the piled STPs packs firmly stable not likely to wobble. Even in stable stacking, when several piling strata of the STPs packs are required, the STPs packs located in the lower portion of a multi-layer STPs packs cooling tower fill system may be likely to be damaged. Hence, they are replaced with STPs packs fabricated with stronger frame, hereby expecting much more stabling structure of stacking of STPs packs.

<Installation of STPs Packs in Cooling Tower> The CoC-STP pack does not have a bottom plate as shown in FIGS. 12A and 12B so that the CoC-STP packs cannot be piled in multi-stacks in the counter current cooling towers. They are only installed in a single layer as shown in FIG. 13 and only in the square or rectangular type counter current cooling towers, other types are possible, which are significant disadvantages of CoC-STPs packs. However, such disadvantages of CoC-STPs packs can be overcome by using CrC-STPs packs as described bellow. The CrC-STP packs can be employed in any type of cross current cooling towers being currently operated. The typical shapes of cross current cooling towers in which the CrC-STPs packs can be installed are rectangle, square, regular pentagon, and regular hexagon, other shapes are possible, as shown in FIGS. 14A, 14B, 14C, and 14D, respectively. Such shapes of the cross counter current cooling towers have one fan blower at the center of the cooling tower and same STPs packs which are symmetrically located around the fan blower except the regular pentagon shape. The rectangular shape cooling tower is a popular shape that most of the currently operating cooling towers employ, because the PVCFs packs are well fitted in the rectangular shape, but because they have difficulties to fit in other shapes.

On the contrary, the CrC-STs packs of the present invention have advantage able to be fabricated to be employed in any shapes of the cross cooling towers. The square, regular pentagon, and regular hexagon shape cooling towers have the entrance of cooling air at the entire outside wall of the cooling tower. Therefore, those types of cooling towers have higher specific surface area of the strings for contacting of water and cooling air than that of the rectangular shape cooling tower, which means higher cooling efficiencies, resulting in reduction of the volume of cooling towers. Hence, they provide an effective usage of the construction space, since they can be designed to fit into the available space. Especially, the hexagonal shape cooling tower provide the highest cooling efficiency (the most effective usage of space), as the shape of the hexagonal cooling tower is close to a circular shape and a circle has the largest area among the shapes with a same perimeter. But any shape of the cooling tower using CrC-STPs pack of the present invention as shown in FIGS. 14A, 14B, 14C, and 14D can replace the current operating circular counter current cooling towers except rectangular shape because they can be designed in a similar scale of the circular cooling towers or in a smaller scale. When the STPs are installed in the rectangular cooling towers, the STPs are designed in rectangular shape as shown in FIG. 2A, but in case of other shape cross current cooling towers, the STPs can be designed in a trapezoidal shape well to fit in the desired cooling tower as shown in FIG. 15.

<Advantages of Present Invention> One of major advantages of the present invention is the ability to substantially reduce the height of the PVCFs pack by ⅓ of its original height to meet the required temperature of the water to be cooled in the current PVCFs packs because the entire surface area of strings is used for contacting between water and cooling air to completely cool water and the cooling function of cooling air is totally employed for cooling water without being significantly resisted by the strings, thereby expecting to maximize heat exchange rate between the water and cooling air.

Another major advantage of the present invention is the ability to fabricate the cooling tower in several shapes other than rectangular like square, pentagon, and hexagon, whose wall surfaces are used as the entrance of cooling air, providing high cooling efficiencies.

Yet another major advantage of the present invention is the ability to replace the counter current cooling towers with any of the square, pentagon, and hexagonal cross current cooling tower, but hexagon is preferred to other shapes, to provide the best operating conditions such as usage of smaller space due to smaller size and less restriction of construction place.

Another major advantage of the present invention is the ability to easily fabricate and install the STPs packs without spending great efforts by press-joining attachment and piling tabs on the frames of STPs without gluing as used in the PVCFs pack and easy carrying the STPs packs because of their light weights.

Another major advantage of the STPs pack is the ability to replace the current operating PVCFs packs without any significant reconstruction, since the standard STPs pack is designed by the same dimensions of the standard dimensions of the PVCFs packs.

Further another major advantage of the present invention is the ability not to create any chances to produce scales and fouling on the surface of the strings and the structure of the STP in the STPs pack, since no eddy current of the water is created on the strings or on the other places in the STPs pack, while the corrugated surface of the film fills and spacers separated the adjacent film fills within PVCFs packs help to creates eddy current on the film fills.

Further major advantage of the present invention is the ability not to nearly resist of flowing of cooling air, because the intervals between the adjacent strings are substantially kept apart from each other not less than 10 mm.

Minor advantage of the present invention is the ability to be in service life of more than 25 years since the polyester strings and aluminum used in the present invention has excellent physical and chemical properties like high melting temperature, high resistance to most chemicals, high tenacity for stretching and shrinking, and high durability.

Another minor advantage of the present invention is the ability to cool the water much hotter than the warm water able to be cooled by the PVCFs pack because the stack height of the STPs packs piling can be extended without loss of their physical integrity or mechanical strength and because they can be of rugged construction with ability to withstand without their damage or loss of shape, since the cooling efficiency of the STPs pack has much higher than that of the PVCFs pack.

Yet another minor advantage of the present invention is the ability to imbibe the water sprayed or poured on the perforated plate into the holes by the surface tension of the strings loaded over the holes on the perforated plate, so that the water is not accumulated on the plate. The water passing the previous STPs pack is almost uniformly dropped on the top plate of the next STPs pack and imbibed by the strings to get into the holes and continuously flows down on the nest strings. Such ability can keep the water uniformly dispersed over the plate and get into the next STPs pack without any accumulation or unevenly flowing down of the water.

And further advantage of the STPs packs of the present invention within the cooling towers is that the materials of the STPs pack, polyester strings, aluminum or aluminum alloy, polypropylene, are non-hazardous and suitable for safe and disposal at the end of service life.

BRIEF DESCRIPTION OF THE DRAWINGS

FIG. 1 is a schematic picture of standard string-thick-plates (STPs) pack assembled 20 STPs to be installed in cross current cooling tower.

FIG. 2A is a schematic picture of CrC-STP.

FIG. 2B is a schematic picture of CoC-STP.

FIG. 3A is a schematic picture of CrC-STP frame.

FIG. 3B is a schematic picture of CoC-STP frame.

FIG. 4A is a rectangular top view of two STPs wound with strings assembled together.

FIG. 4B is a rectangular bottom view of two STPs wound with strings assembled together.

FIG. 4C-*left* illustrates a top view of assembling together of two left edge trapezoidal STPs wound with strings.

FIG. 4C-*right* illustrates a top view of assembling together of two right edge trapezoidal STPs wound with strings.

FIG. 5A is side views of male and female frames with attachment tabs and piling tabs.

FIG. 5B is locations of male/female attachment tabs on frame.

FIG. 5C-1 is a cross sectional view of top frame at 5C-1-5C-1 cross section of top frame as shown in FIG. 5B

FIG. 5C-2 is a cross sectional view of bottom frame at 5C-2-5C-2 cross section of bottom frame as shown in FIG. 5B.

FIG. 5C-3 is cross sectional views of left-side frame at 5C-3-5C-3 cross sections of left-side frame shown in FIG. 5B.

FIG. 5C-4 is cross sectional views of right-side frame at 5C-4-5C-4 cross sections of right-side frame shown in FIG. 5B.

FIG. 6A is an assembling method aligning attachment tabs on the frame of STP with and inserting into the adjoining STP's tabs.

FIG. 6B is an assembled configuration of the male and female tabs by pressing to create a strong and permanent binding without any gluing.

FIG. 7A is a schematic picture of hairy string.

FIG. 7B is a schematic picture of water film formed on the surface of hairy string.

FIG. 7C is a schematic picture of water formed on surface of non-hairy string.

FIG. 8 illustrates the variation of flow rate of water passing through free hole of different diameter.

FIG. 9A illustrates the configuration of holes and specific number of holes per unit area, 9 holes/18.7 $cm^2$, of top perforated plate of experimental string-thick-plates pack (100 (W)×100(D)×100(H) cm) using string of 2.5 mm in diameter and hole size of 4.5 mm in diameter FIG. 9B illustrates the configuration of holes and specific number of holes per unit area, 9 holes/17.6 $cm^2$, of top perforated plate of STPs pack using string of 2.5 mm in diameter and hole size of 4.8 mm in diameter.

FIG. 9C illustrates the configuration of holes and specific number of holes per unit area, 9 holes/30 $cm^2$, of top perforated plate of STPs pack using string of 5 mm in diameter and hole size of 9.6 mm in diameter.

FIG. 9D illustrates the configuration of holes and specific number of holes per unit area, 9 holes/46.46 $cm^2$, of top perforated plate of STPs pack using string of 7.5 mm in diameter and hole size of 14.43 mm in diameter.

FIG. 10 shows the variation of specific surface area of STPs pack as a function of string diameter.

FIG. 11 illustrates a stacking configuration of the STPs packs.

DESCRIPTION OF NUMBER IN THE DRAWINGS

Figure 15:
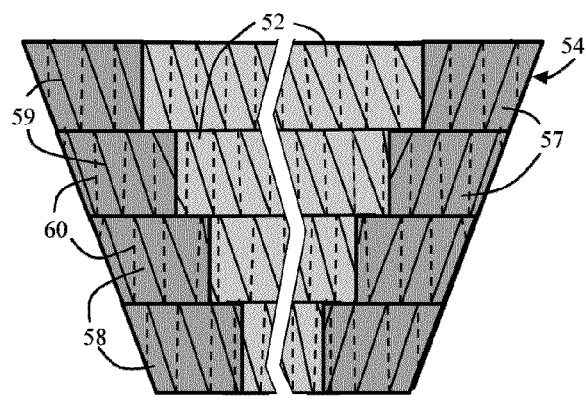
FIG. 15 illustrates a configuration of installation of trapezoidal and rectangular shape STPs packs in square, pentagonal, and hexagonal cooling towers.

1 STPs pack to be installed in cross current cooling tower (CrC-STPs pack)
2 STP (simple notation of CrC-STP, single unit of STP)
3 string (non-hairy string or hairy string)
4 top perforated plate distributing water into the STPs pack
5 string loaded hole passing water through it
6 guiding wall to control direction of traveling of cooling air
7 bottom perforated plate passing water out of the STPs pack
8 pathway of cooling air 9 top frame of CrC-STP frame
10 side frame of CrC-STP or CoC-STP frame
11 bottom frame of CrC-STP frame
12 CoC-STP
13 top frame of CoC-STP frame
14 bottom frame of CoC-STP frame
15 frame of CrC-STP
16 push button string holder
17 male piling tab
18 semi-circular hole
19 male attachment tab
20 supporter
21 frame of CoC-STP
22 standard VSS consisting of 16 or 32 turns of string loaded through semi-circular holes on the frames of the CrC-STP or CoC-STP.
23 thickness of STP (height of equilateral triangle) shown in FIG. 4B.
24 equilateral triangle
25 top surface of STP A
26 bottom surface of STP A
27 top surface of STP B
28 bottom surface of STP B
29 location of attachment tabs on the STP frame
30 female attachment tab
31 female piling tab
32 height of supporter
33 strong and permanent binding
34 hairy string
35 hair
36 water film formed on the surface of the hairy string
37 non-hairy string
38 water film formed on the surface of the non-hairy string
39 counter current cooling tower
40 fill media of CoC-STPs packs installed in V-type assembly in counter current cooling tower
41 fill media of CoC-STPs packs installed in cross type assembly in counter current cooling tower
42 fan blower
43 water supplier
44 water sprayer
45 water drain pipe
46 cooling air entrance of counter current cooling tower
47 traveling direction of cooling air
48 V-type assembly of CoC-STPs packs
49 CoC-STPs pack
50 Bottom of the CoC-STPs packs
51 rectangular cross current cooling tower
52 rectangular assembly of CrC-STPs packs
53 square cross current cooling tower
54 trapezoidal assembly of CrC-STPs packs
55 pentagonal cross current cooling tower
56 hexagonal cross current cooling tower
57 right trapezoidal CrC-STPs pack placed at the right edge of the fill zone of the trapezoidal assembly shown in FIGS. 15, 4C-left, and 4C-right
58 left trapezoidal CrC-STPs pack placed at the left edge of the fill zone of the trapezoidal assembly
59 string passing over the surface of the top frame
60 string passing over the surface of the bottom frame
61 cross section view of the frame shown in FIGS. 5C-1, 5C-2, and 5C-3.
62 side view of the male attachment tabs on the male frame in FIG. 5A.
63 side view of the female attachment tabs on the female frame in FIG. 5A.
64 pre-VSS of the CrC-STP containing 8 or 16 turns of string in FIG. 2A.
65 pre-VSS of the CoC-STP containing 8 or 16 turns of string in FIG. 2B.
66 direction of pressing to join male and female in FIG. 6A.

DETAILED DESCRIPTION OF THE PREFERRED EMBODIMENT

There are several factors for designing of the STP to be determined by conducting experiments and using out sources. They are the number of strings per unit cross section of the STP pack, diameter of the string holes on the top surface of the STPs pack, diameter of the strings, effective length of the strings for cooling water, and verification of flying away of water out of string due to the cooling tower fan speed, which should be understood and determined to effectively and economically design the STPs pack. To have achieved such aims, several exemplary experiments using a simulated cooling tower fill media like string fill rectangular column of 250× 250×1500 mm were conducted, and the results were described in the previous patent Korean Patent No. 100393126. They are briefly described here. The string fill rectangular column consists of a water-distributing-zone on top of the column, a string-holding-perforated-plate on the bottom of the column, and a string-fill-heat-exchanger located between them. The water-distributing-zone was partitioned from the string-fill-heat-exchanger with a water-distributing-perforated-plate. The water-distributing-perforated-plate is in 250×250 mm and has uniformly distributed holes on it, and it has a function of passing water through the holes. The string-fill-heat-exchanger is fabricated by tightly suspending 200 strings of 2.5 mm in diameter through and over the holes located on the top and bottom perforated plates of the string-fill-heat-exchanger, which is in shape of a rectangular column simulated cooling tower fill media. The water is supplied onto the water distributing zone on the top of the column and passing through the holes on the perforated plate, and then flowing down on the surface of the strings suspending through the holes. The water flowing down on the surface of strings is cooled by contacting with cooling air entering the string fill heat exchanger from its one side and passing through the string fill heat exchanger towards the opposite side. Using this simulated cooling tower fill media experiment, the design factors described above were determined, which are described below.

<Determination of Hole Sizes> The holes 5 on the top surface 4 of the STPs pack 1 have two functions like suspending the strings 3 through and over the adjacent holes 5 and passing water through them. The size of the hole 5 should be large enough for water to smoothly pass through the hole extra space except the space occupied by string 3 in the hole 5. The extra space should not be too large, but not too small. If too large, most of the pumped water passes through the large holes located on the spot supplied with the water without spreading over the perforated plate 4, while if too small, a portion of the pumped water does not pass and accumulates on the top surface 4 of the STPs pack 1. Hence, an optimum size of the holes 5 for water to smoothly and evenly pass through the hole extra space of the entire holes 5 on the perforated plate 4 should be determined. The determination of the optimum sizes of the holes 5 and optimum number of holes per unit cross section area (OSNH) of the STPs pack are essential to solve such problems. The optimum sized holes 5 can be determined by employing previous experimental results obtained using the simulated cooling tower fill media experiment and changing the perforated plates of its water distributing zone with the several perforated plates including 8 holes per 25 cm² of different free holes (i.e. string unloaded hole) in the range of 1 to 6 mm in diameter.

The experimental data are shown in FIG. 8, which shows that the water flow rate passing through the holes 5 in different diameter linearly increases as increases the diameter of the hole 5. FIG. 8 is used to determine the smooth flow rate of water passing through free space of the hole 5 loaded with string 3. For instance, the free space of the hole 5 of 4.5 mm in diameter used for performance test of the STPs pack 1 of the present invention can be estimated to be 11 mm² by subtraction of a cross section area of the string 3 of 2.5 mm in diameter from the area of the string loaded hole 5 of 4.5 cm in diameter. The 11 mm² of the free space of the hole of 4.5 mm in diameter is equal to the cross section area of the free hole of 3.74 mm in diameter. Therefore, it can be understood from FIG. 8 that the smooth flow rate of water to pass the hole of 3.74 mm in diameter is read to be 0.0425 l/min/hole as indicated in FIG. 8. The results of the performance test of the STPs pack of the present invention using a typical commercial operating flow rate, 220 l/min per 1×1 m², of the currently operating PVCFs pack shows that the flow rate of water supplied into the STPs pack 1 was 0.046 l/min/hole, which is computed as 220 l/min/10000 cm²×18.7 cm²/9 holes using the specifications of STPs pack 1 used in the experiment. The comparison of these two computational results shows that the value of the flow rate read from FIG. 8 is close to the value computed using the experimental results. Hence, it can be understood that FIG. 8 can be used for the computation of the hole size for a known flow rate of water passing through the hole 5 to be applied to the STPs pack 1 and vise versa.

<Determination of Correlation Factor for Computation of Hole Size from Arbitrary String Size> For the determination of the hole size, it is necessary to estimate the hole size based on the size of string 3, since a hole free space, which is an extra space remained by subtracting the space occupied by string in the string loaded hole from its whole space, varies depending on the cross section of the string 3. The results of the exemplary experiment using the STPs pack 1 can be used as a standard condition, since the flow rate through the hole free space estimated from FIG. 8 is close to the result obtained through the experiment. From the experimental results, the relationship between the hole size and string size used in the STPs pack 1 can be driven. The area of the hole of 4.5 mm in diameter is equal to 3.24 times the area of the cross section of string of 2.5 mm in diameter. In this case, the flow rates of water passing through the hole free space computed from experimental results and estimated from FIG. 8 are 0.046 and 0.0425 l/min/hole, respectively, which are equivalent to 220 and 205 l/min of amounts of water supplied into the STPs pack 1. The amounts of water supplied into the STPs pack 1 are a little different. To reduce this difference, the hole free space should be increased. To do so, the fraction, 3.24, of hole area/string-cross-section-area should be increased. A proper fraction is chosen to be 3.7 which is called "correlation factor." Using the correlation factor 3.7, the flow rate estimated from FIG. 8 is 0.045 l/min/hole, which is close to the experimental flow rate, 0.046 l/min/hole, so that the correlation factor of 3.7 is determined for estimation of a hole area of the string loaded hole. Using such an experimental result, an experimental computation formula for determining the diameters of a string loaded hole and string free hole necessary to read flow rate of water from FIG. 8 are respectively $Hd=1.924 Sd$, and $Fd=1.64 Sd$, where Hd is a diameter of a string loaded hole, Fd is a diameter of string free hole and Sd a diameter of string. Contrarily, the estimation formula for determining a diameter of the string loaded hole using a given flow rate and string diameter is $Hd=\text{root}(Fd^2+Sd^2)$ and the one for string diameter for given Hd is $Sd=\text{root}(Hd^2-Fd^2)$ where Fd is read from FIG. 8 for the given flow rate. The experimental computation formula driven above were obtained by straightforward arithmetic computation using a circle area computation formula. For instance, in case of employing string 3 of 0.75 cm in diameter for the STPs pack 1 under the similar conditions used for experiment, the diameter of the string loaded hole and free hole are 1.924×7.5 mm=14.4 mm and 1.64×7.5 mm=12.3 mm. So the flow rate of water through the string loaded hole can be read to be 0.18 l/min/hole from FIG. 8 as indicated in the FIG. 8. Hence, for the STPs pack in 1 square meter using strings of 7.5 mm in diameter, the loadable flow rate of water is 866 l/min (other flow rate is possible).

<Determination of Number of Strings per Unit Cross Section of STPs Pack> If the OSNH of the STPs pack 1 are not determined, the same problems described above occur: the water pumped onto the top plate 4 of the STPs pack 1 accumulates on it (meaning underestimated number of holes per unit cross section area) or flows down through the holes 5 near to the pumped spot of the top plate 4 not to spread over the top plate 4 (meaning overestimate number of holes per unit cross section area are provided). Therefore, the proper number (optimized number) of holes 5 of the selected size of the string should be prepared on the top 4 and bottom 11 plate of the STPs pack 1. To accomplish such an objective, the results of the experiment conducted using the simulated cooling tower fill media experiment described above are employed in the present invention. The specific number of holes 5 on the perforated plate 4 of the STPs pack 1 of the experiment was 9 holes per 18.7 cm², using string 2.5 cm in diameter and hole size of 4.5 mm in diameter as shown in FIG. 9A. The intervals between the centers of the adjacent holes of the experiment were 14.8 and 15.8 mm. Since the interval of 14.8 mm in case of string of 2.5 mm in diameter is a minimum allowable limit of the adjacent strings not to be contacted (14.8 mm is determined from hole size+10 mm, fixed interval between the edges of the adjacent holes as described below), the 15.8 mm can be necessary to be adjusted to 14.8 mm. To employ this specific number of holes 5 on the perforated plate 4 of the STPs pack 1 of the experiment to that of the present invention, the intervals between the adjacent holes 5 are slightly rearranged to become same. Then the holes 5 are located at the vertices of an equilateral triangle as shown in FIG. 9B. As results of rearranging the holes, the optimum number of holes 5 on the perforated plate 4 are changed into 9 holes per 17.6 cm² from 9 holes per 18.7 cm² and the distance between horizontal lines of holes 5 is changed into 1.3 cm from 1.4 cm as shown in FIG. 9B. The rearranged configuration of the holes 5 on the perforated plate 4 is used as a standard perforated top plate 4 of the standard STPs pack 1 for fabricating of other STPs packs 1. Hence, the standard perforated plate 4 has a specific number of holes on the perforated plate 4, 9 holes/17.6 cm², interval of 1.5 cm between adjacent holes 5 in a position of equilateral triangle, distance of 1.3 cm between horizontal lines of holes 5, and entire holes lying in a position of zigzag along the air flowing direction as shown in FIG. 9B. Such zigzag arrangement can increase the direct contacting rate of cooling air and water on the surface of the strings. For the strings of 5 mm in diameter, the holes are located in the position as shown in FIG. 9C exactly same way as shown in the standard plate maintaining same interval of 1 cm between adjacent holes 5. The specific number of holes 5 on the perforated plate 4 using the string of 5 mm in diameter is 9 holes/30 cm².

<Cooling Effect of Length of String> When the water is cooled by contacting with the cooling air traveling perpendicularly or on the slant to the descent of water flowing on the surface of the string 3, the long contacting time of water with the cooling air increases the cooling effect of the water. In other words, the longer is the string 3, the lower temperature the water can be cooled down to. Since the water is cooled by environmental air surrounding the cooling tower, however, it cannot be cooled lower than the temperature of the environmental air and then the cooling effect of the string 3 is not apparently significant after a certain length of the string. Therefore, the active length of the string 3 to effectively cool the water should be determined to reduce a manufacturing cost. The determination of a proper length of the string 3 between the top 4 and bottom 7 plates of the STPs pack 1 had been conducted by using the simulated cooling tower fill media experiment described above. The results are summarized here below. Water to be cooled was pumped into the string heat exchanger of the experimental simulated cooling tower through the holes 5 on the top 4 of the experiment to flow down on the surface of the strings 3. During passing through the experimental column, an indoor air (cool air in FIG. 1) was forced to pass by the fan blower through the strings 3 perpendicularly to the vertical length of the strings 3. The variation of the water temperature along the strings 3 was detected at three position of top, middle, and bottom level of the column. Temperature of the inlet water was changed from 20 to 60° C. The experimental results show that 100 cm long string 3 is enough for cooling the water of less than 50° C. to environmental temperature surrounding the cooling system and that a string 3 of 150 cm in length is necessary for cooling the water of higher than 50° C.

<Cooling Effect due to String Type> Since the water cooling efficiency of the cooling towers is depending on the contacting time and area between water and cooling air, the longer contacting time and larger contacting area are provided, the higher water cooling efficiency can be expected. To provide such longer contacting time on the surface of string, the water flowing down on the surface of string remains on the surface of string as long as possible. To meet these conditions, the flowing distance of water or a resistance of string able to reduce the flowing of water on the string surface should increase. To increase the flowing distance and resistance of string, the present invention employs two special types of strings; spiral corrugated non-hairy strings and spiral corrugated hairy strings. The spiral corrugated non-hairy and hairy strings are made by spinning of two or three non-hairy and hairy strings (other corrugated strings are possible), respectively. The fabrication of the spiral corrugated strings needs about 5 percent non-spiral longer string, which means that the contacting time can increase by that much time equivalent to the longer length of the string. The water flowing on the surface of the spiral corrugated string is flowing down along the spiral gullies over the surface of the strings, resulting in flowing a little longer distance than that of the water to straightly flow down on the surface of non-spiral gully string.

The hairy string 34 is the string which has a lot of hair 35 on the surface of string 3, holding much more water on the surface of the hairy string 34 compared with the amount of water holding on the surface of the non-hairy string 37. Such a high capability of holding water on the surface of the hairy string 34 is accomplished by surface tension formed among the hair 35 on the hairy string 34. FIG. 7A shows the schematic picture of a hairy string 34 and FIG. 7B shows the cross section of the hairy string 34 holding water on its surface, compared with that of non-hairy string 35 shown in FIG. 7C. Since the non-hairy string 37 holds water on its surface by surface tension formed by the string surface only, the thickness of water film 38 formed is thin, but the hairy string 34 holds more water by strong surface tension formed by the string surface as well as the hair 35, resulting in making the water film 36 on the string surface thicker as shown in FIG. 7B. Holding of more water among the hair 35 on the surface of string means as much increased resistance of flowing water as the rate of holding water. As a result of this, the surface of water film 36 formed on the surface of the hairy string 34 is significantly larger than that of the non-hairy string 37. In turn, the contacting surface of water and cooling air for the hairy string 34 is larger than for the non-hairy string 37, and therefore the cooling effect of the hairy string is higher than that of non-hairy string. And the flowing speed of water on the surface of the string is resisted by the strong surface tension formed on the surface of the hairy string 34 so that the flowing speed of water gets slower for the hairy string 34. The results of the testing experiment of effect of hairy strings 34 conducted for previous patent of the owner of the present invention shows that the water cooling effect of the hairy string 34 is increased by 15 percent compared with that of the non-hairy string 37: in other words, in order to cool water down to the same temperature having cooled by the non-hairy string 37, a 15 percent shorter length of the hairy string 34 is required, which means the reduction of the fabrication cost of the STPs pack 1 by the same rate in case of using the hairy string 34.

<Verification of Flying Away of Water out of String due to Fan Speed of Current Cooling Tower.> While water is flowing down on the surface of the string 3, the fan blower 42 blows the cooling air to pass through the strings 3 to cool the water. In case that the blowing air is strong, some water flowing down on the surface of the strings 3 may fall off the strings 3 and be blown away out of the cooling tower. To verify the air flow affording to fall water off and blow it away from the strings 3, the testing of the water falling off strings had been simultaneously conducted by increasing the air blowing rate while the determination of effective length of the string 3 conducted. The results of observation of the water fallen off strings 3 due to the strength of air flow forced by the fan blower 3 showed that the falling-off of the water started at the air flow of 25 m$^3$/min (883 ft$^3$/min). Considering the air flow employed in conventional cooling tower is 11 m$^3$/min (388 ft$^3$/min), the falling-off of water from the strings 3 cannot be expected when the STP packs 1 are employed in the cooling towers.

<Determination of Slanting Angle of String> If the strings 3 are vertically placed parallel to the direction of traveling upwards of the cooling air 47 and the water flowing down on the surface of the strings contacts with cooling air flowing upwards, most of cooling air 47 is passing through the strings 3 without contacting with the water and therefore the water is not cooled enough. Hence, to increase their contacting area, the cooling air 47 should pass across the strings 3. The maximization of their contacting area can be made when they are perpendicularly passed each other. However, such a contacting method is actually used in the cross current cooling towers, but not possible in the counter current cooling towers 39. In the counter current cooling towers 39, the strings 3 should be slanted and then the cooling air 47 can pass over the whole length of the strings 3. When the strings 3 are more slanted from the vertical direction of the flowing air 47, the contacting area is larger. But there exists a slant angle of the string 3 from its vertical direction at which the water flowing down on the surface of the string 3 starts to fall off the string 3. To find the slanting angle of the string 3, a simple experiment for observation of falling-off of water flowing along the string 3 due to the extent of slanting of the string 3 was conducted. Through conducting of such an experiment, a slant angle of the string 3 for the water to start falling off was determined to be 40 degree. However, a little smaller slant angle of 35 degree is used for a conservative designing of the frame of the CoC-STP 21.

<Interval Between Adjacent Strings> The short interval between adjacent strings 3 makes the adjacent strings 3 easily contacted to join together, resulting in decreasing the water cooling efficiency of the string heat exchanger, while the long interval also decreases the water cooling efficiency of the strings heat exchanger, because the long intervals decrease a specific number of strings per cross sectional area of the STPs pack. So a proper interval, not too short and not too long interval, should be determined to prevent the decreasing of the water cooling efficiency of the string heat exchanger. The determination of such intervals between adjacent strings 3 were described in detail in the previous patent Korean Patent No. 100393126 owned by the inventor of the present invention and the results are briefly summarized here. The experimental results shows that the shortest interval able to avoid the easy joining of adjacent strings 3 was 7.8 mm: the strings 3 positioned with shorter intervals than 7.8 mm might have more chances to easily join together. Using such a result, the interval between the adjacent strings 3 in the present invention is determined to be 10 mm to preserve the conservative designing of semi-circular holes 18 on the top 9, 13 and bottom frame 11, 14 of the STP 2 of the present invention. The interval between the adjacent strings 3 indicates the distance between the surfaces of the strings 3, since the strings 3 are suspended over the closest edges of the adjacent holes 5. Hence, the distance between the edges of the semi-circular holes 18 on the frame 9, 13 of the STP 15, 21 of the present invention is determined to be 10 mm, which is kept constant and employed for designing the position of the semi-circular holes 18 on the frame 9, 13 using any strings 3 of any diameter.

<Variation of Specific Surface Area of STPs pack Depending on String Diameter> The variation of the specific surface areas of the STPs pack 1 as a function of the diameter of the string 3 are shown in FIG. 10. The data shown in FIG. 10 are estimated by keeping the interval between the edges of the adjacent holes 5 constant, 10 mm, other intervals are possible, and using the experimental data obtained from the exemplary experiment. From FIG. 10, it can be seen that the largest specific surface areas of the STPs pack 1 using the holes of 1.924 and 1.412 times the diameter of strings 3 are respectively 15 ft$^2$/ft$^3$ in a case of thick string 3 of 7.5 mm in diameter and 19 ft$^2$/ft$^3$ for the thin string 3 of 5 mm in diameter. The reason increasing the specific surface area due to decreasing the size of the hole 5 is because the decreased size of the holes 5 makes the OSNH of the STPs pack 1 increased. Also comparing specific surface area, 15 ft$^2$/ft$^3$, of the STPs pack 1 fabricated with thick string 3 of 5 mm in diameter with 13 ft$^2$/ft$^3$ of the STPs pack 1 with thin string 3 of 2.5 mm in diameter in the case of using the hole size of 1.924 times string diameter, it can be understood that the length of the STPs pack 1 using thick strings 3 can be fabricated shorter than that of thin string by 15 percent. Applying these results and experimental data (described in the section of performance test of the STPs pack) to the current operating PVCFs pack, the height of the cooling towers can be reduced up to 35 percent, when the STPs packs 1 fabricated with strings 3 of 5 mm in diameter are replaced for the PVCF packs.

<Fabrication of Frame Including Attachment Tabs and Semicircular Holes on Frame> The frames 15, 21 of the STP 2 of the present invention are shown in FIGS. 3A and 3B which are in the rectangular shape and used as standard frames 15, 21 (any other shape of standard frames are possible), whose standard sizes are 30.48(W)×121.92(H) and 60.96(W)×121.92 cm(H) (other sizes are possible). They are same with two short standard sizes of the current operating PVC film fills, see the description of standard sizes of the current operating PVCF packs in http://www.process-vooling.com/copyright/ bf9b3bbf7a5b7010VgnVCM'00000f932a8c0, Tower performance, Inc.'s Film Fills-C.E. Shepherd Company, The other longer sizes are excluded because the longer strings 3 between the top 9, 13 and bottom frames 11, 14 may have more chances to easily join together by forced vibrating by the cooling air traveling through the strings 3 and because they can be replaced with those two standard sizes 15, 21. The rectangular frame 15, 21 should robustly support to keep strings 3 over the frame in the rectangular plate shape without changing its original shape and the top 9, 13 and bottom frames 11, 14 hold strings in assigned positions. And also the rectangular frame 15, 21 should not be significantly bent due to pulling strength of the strings 3. To meet such criteria of the frame, the top 9, 13, bottom 11, 14, and side frames 10 are designed to be supported with the trapezoidal shaped supporters 20, other shapes are possible, as shown in FIGS. 5B, 5C-1, 5C-2, and 5C-3. The top 9, 13, bottom 11, 14, and side frames 10 of the STP frame 15, 21 are fabricated in one frame or by joining top 9, 13, bottom 11, 14, and side frames 10 as shown in FIG. 5B. The cross section 61 of the frame 15, 21 in case of using string of 5 mm in diameter is in 17(thickness)×22 (height) mm, other sizes are possible, including 5 mm of height of the trapezoidal supporters 20. The supporters are attached on the beneath or side of the frames 15, 21 as shown in FIGS. 5C-1, 5C-2, and 5C-3 not to be bent by pulling force of the strings 3 as shown in FIGS. 5C-1, 5C-2 and 5C-3. To combine STPs 2, male 19 and female attachment tabs 30 are made on the STP frames 15, 21. The assembly of STPs 2 is made by aligning the attachment tabs 19, 30 on the frames of adjacent STPs with and inserted into the counterpart attachment tabs 19, 30 of the adjoined STPs and by pressing 66 them as shown in FIGS. 6A and 6B.

The configuration 62, 63 of the male 19 and female attachment tabs 30 on the frame 9, 10, 11, their locations 29 on the frame 9, 10, 11, and cross section view 61 of the frame 9, 10, 11, are shown in FIGS. 5A, 5B, 5C-1, 5C-2, and 5C-3. FIG. 5A shows schematic side pictures of the male 19 and female attachment tabs 30 attached on the male 62 and female frames 63 of the STP 2, respectively. There are any other possible methods to combine the STPs 2, but their assembly method preferred in the present invention can save fabrication efforts and cost because of easy assembly like just pressing 66 male 19 and female tabs 30 to create a strong and permanent binding 35 without any gluing as used for packing PVCFs. When the STPs packs 1 are piled up, it is necessary to robustly fix the STPs packs 1 on the top of the STPs pack 1. To do so, two of male 17 and female piling tabs 31 are made respectively on the top 9 and bottom frames 11 of the STP 2. Their locations 31 of the attachment tabs and piling tabs are shown in FIG. 5B. Each of top 9, bottom 11, and side frames 10 can be separately fabricated by extruding hot melted aluminum, HDPE or polypropylene (other materials are possible) through frame molders using a hot temperature extruder machine and then they can be joined together to make one frame. Also a single frame including top 9, bottom 11, and side frames 11 can be made by the extruder machine.

<Description of Loading String Over the STP Frame/Fabrication of STPs> The STPs 2 of the present invention are shown in FIGS. 2A and 5B. FIGS. 2A and 2B show the schematic pictures of the CrC-STP 2 and CoC-STP 12, respectively. The CrC-STP 2 and CoC-STP 12 are fabricated by winding a long single string 3 of 5 mm in diameter by 8 turns passing through the every other semicircular holes 18, separated by 10 mm (interval between edges of adjacent holes of 9.62 mm in diameter), on both sides of the top 9, 13 and bottom frames 11, 14 of 30.48 cm long in the longitudinal direction of the STP frame 15, 21 shown in FIGS. 3A and 3B. As shown in FIGS. 2A and 2B, the single unit of CrC-STP 2 or CoC-STP 12 has two pre-VSSs 64, 65 (consists of half of total number of strings) on its both sides. When they are combined to fabricate a STPs pack 2, however, each side of the CrC-STP 2 or CoC-STP 12 combines with one side of the other CrC-STP 2 or CoC-STP 12 to produce one perfect VSS 22 as shown in FIGS. 4A, 4B, 4C-left and 4C-right, which show the part of the top 25, 27 and bottom views 26, 28 of the combined two CrC-STPs 2 or CoC-STPs 12. The top 25, 27 and bottom surface thickness 26, 28 of the CrC-STP 2 fabricated with strings 3 of 5 mm in diameter are same as 17 mm, while those of the CoC-STP 12 are 25.8 mm and 36.8 mm, respectively. The winding process of a long single line over frames 15, 21 is described in detail as follows. First, the end of the string 3 should be fixed at a push button holder 16 on the one edge of the surface of the top frame 9, 13 of the STP frame and then the string 3 is continuously wound over every other semicircular holes 18 on the top frame 9, 13 and bottom frame 11, 14 by continuously pulling the string 3 tight until wound over the last semicircular hole 18 on the opposite side of the top and bottom frames and the end edge of the string 3 fixed at the push button holder 16 on the opposite side of the top frame 9, 13. The STPs 2 loaded with strings are shown in FIGS. 2A and 2B. Such a winding process of the string over the STP frames 15, 21 can be manually accomplished, but an automatic process is preferred.

<Fabrication of STPs Pack> The STPs pack 1 of the present invention is shown in FIG. 1, which is a standard columnar pack, 30.48(W)×30.48(D)×121.92(H) inches or 60.96(W)×60.96(D)×121.92(H) cm (any sizes of the standard columnar STPs pack are possible) of the cross current cooling towers. The standard columnar STPs packs 1 are made by assembling a plurality of the STPs 2 shown in FIGS. 2A and 2B by joining attachment tabs 19, 30 on frames of adjacent STPs 2 together. The planar dimensions of standard VSSs 22 are 30.48(W)×121.92(H) cm and 60.96(W)×121.92(H) cm (any sizes are possible) same with those of the standard STPs pack 1. The thicknesses 23 of the standard STPs 2 of the present invention are 13 mm, 17 mm, and 21 mm in case of using the string 2.5, 5, and 7.5 mm in diameter, respectively, as shown in FIGS. 9B, 9C, and 9D. Hence, to fabricate standard STPs packs 1 of 30.48(W)×30.48(D)×121.92(H) cm using string 3 of 2.5, 5, and 7.5 mm in diameter, 24, 18, and 15 of STPs 2 are respectively required. The fabrication of the STPs pack 1 is simple and does not require as much efforts as required for fabrication of PVCFs pack. Male 62 and female STP frames 63 are joined by aligning male 19 or female attachment tabs 30 with and being inserted into the counterpart attachment tabs of the adjoined male 62 or female STP frames 63 by pressing 66 them as shown in FIGS. 6A and 6B. And then other male 19 or female frame counterpart 32 to the previous assembled. STP frame 62, 63 is joined by the same way as before. Such joining processes are continued until the last STP 2 of the required number of STPs 2 is perfectly attached to the previous one to fabricate STPs pack 1 as shown in FIG. 1. The STPs 2 to be placed at the cooling air inlet and outlet sides of the STPs pack 1 have piling tabs 10, 31 near at both edges of the STP frame 15, 21 and the STPs 2 without piling tabs 10, 31 are placed inside of the STPs pack 1. Hence, the piling tabs 10, 31 on the STPs pack 1 are used for fixing the STPs pack 1 on the top of the previous STPs pack 1 when they are stacking.

Figure 12A:
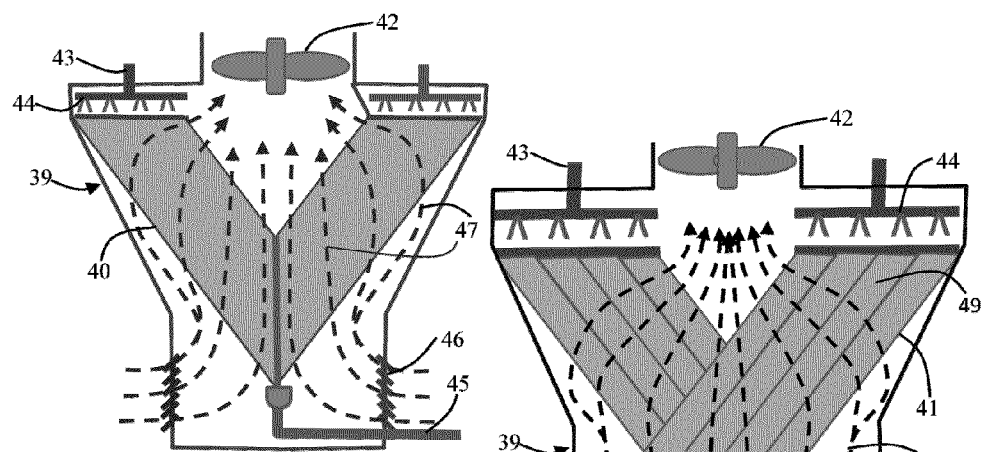
FIG. 12A illustrates a schematic picture of typical counter current (semi-counter current) cooling tower with V-type assembled CoC-STPs packs and traveling direction of cooling air.
Figure 12B:
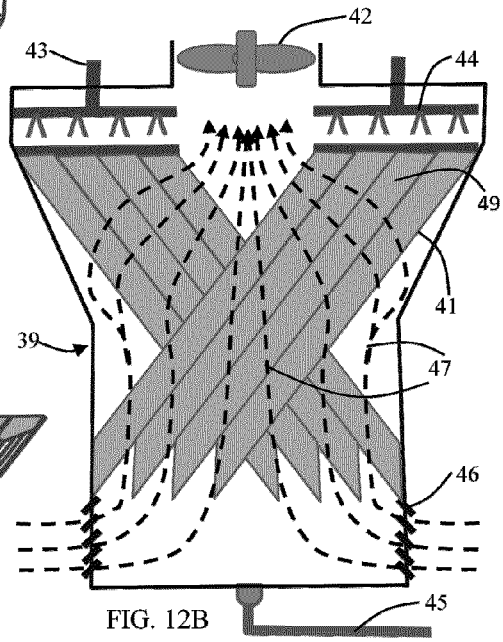
FIG. 12B illustrates a schematic picture of typical counter current (semi-counter current) cooling tower with cross type assembled CoC-STPs packs and traveling direction of cooling air.
Figure 13:
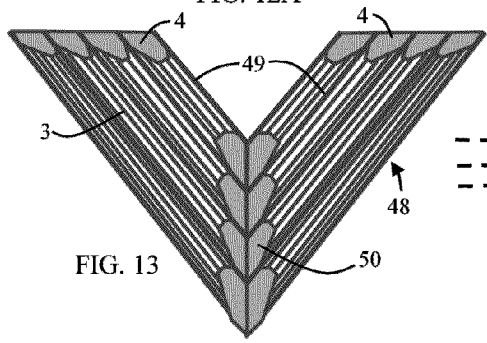
FIG. 13 illustrates the side sectional view of CoC-STPs packs installed in counter current cooling tower.

<Installation of STPs Packs in Cooling Tower> Installation of the STPs packs 1 of the present invention is exactly same as installed in the current PVCFs packs for a cross current cooling towers, but quite different for a counter current cooling towers. FIGS. 12A and 12B show the configuration of the cooling tower fill media using the CoC-STPs packs installed in the counter current cooling towers. The CoC-STPs packs 40 installed in FIG. 12A are assembled into a V-type heat exchanger 50 as shown in FIG. 13 and the CoC-STPs pack 41 shown in FIG. 12B are installed X-type arrangement of the CoC-STPs packs 51. The CoC-STPs pack 51 is fabricated by assembling several CoC-STP 12 as described in previous section. Application of the CoC-STPs pack 51 is limited not like that of the current PVCFs in the counter current cooling towers, because it is installed only in the square type counter current cooling towers.

Figure 14A:
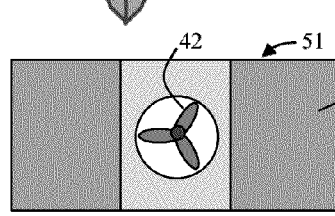
FIG. 14A shows a schematic picture of a rectangular cross current cooing tower.
Figure 14B:
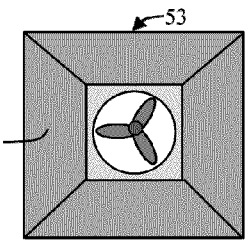
FIG. 14B shows a schematic picture of a square cross current cooling tower.
Figure 14C:
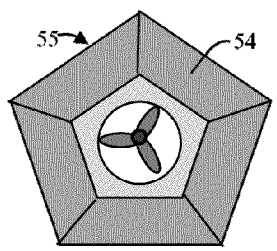
FIG. 14C illustrates a pentagon cross current cooling tower.
Figure 14D:
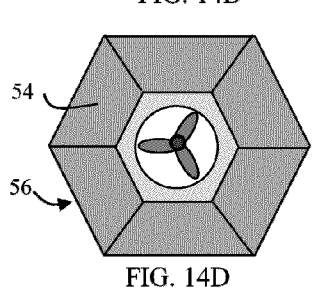
FIG. 14D illustrates a hexagon cross current cooling tower.

However, the CrC-STPs packs 1 are employed in any type of cross current cooling towers being currently operated. The typical shapes of cross current cooling towers that the CrC-STPs packs 1 can be installed in are rectangle 51, square 53, regular pentagon 55, and regular hexagon 56 (other shapes are possible) as shown in FIGS. 14A, 14B, 14C, and 14D, respectively. Such shapes of the cross counter current cooling towers have one fan blower 42 at the center of the cooling tower and same STPs packs 1 which are symmetrically located around the fan blower 42 except the regular pentagon shape 55. The rectangular shape cooling tower 51 is a popular shape that most of the currently operating cooling towers employ, because the PVCFs packs are well fitted in the rectangular shape 51, but because they have difficulties to fit in other shapes. On the contrary, the CrC-STP packs 1 of the present invention have advantage able to be fabricated to be fitted in any shapes of the cross counter cooling towers. The square 53, regular pentagonal 55, and regular hexagonal shape cooling towers 56 have the entrance of cooling air at the entire outside wall of the cooling tower. Therefore, those types of cooling towers may have higher specific surface area of the strings 3 for contacting of water and cooling air than that of the rectangular shape cooling tower 51, which means higher cooling efficiencies, resulting in reduction of the volume of cooling towers. Hence, they provide an effective usage of the construction space, since they are relatively small and can be designed to fit into the available space. Especially, the hexagonal shape cooling tower 56 provide the highest cooing efficiency (most effective usage of space), as its shape is close to a circular shape which has the largest area among the shapes with the same perimeter. And also they can replace the circular counter current cooling towers because they can be designed in a similar scale with them or in much smaller scale. When the CrC-STPs are installed in the rectangular cooling towers 51, the only rectangular shaped CrC-STPs packs 2 are installed, but in case of CrC-STP's installing in other shape cross current cooling towers, their fills zones are in the shape of trapezoid 54 as shown in FIGS. 14B, 14C, and 14D. Hence, the CrC-STPs 2 located at both edges of the fills zones 54 are fabricated in trapezoidal shapes 57, 58 as shown in FIG. 4C-*right*, 4C-left, and FIG. 15. The combining installation of the trapezoidal CrC-STPs 57, 58 and rectangular CrC-STPs 2 produces a trapezoidal assembly of CrC-STPs packs 54 by installing together with the rectangular CrC-STPs packs 52 located in the middle of their installation as shown in FIG. 15.

<Exemplary Performance Test/Hairy String> The characteristics of the hairy strings 34 were extensively examined using several experiments which are described in previous patents, Korean Patent No. 100516392 and PCT/KR3004/001825: cooling rate of the hairy string fill heat exchanger, cooling rate of hairy string heat exchanger due to its cooling active length, cooling effect of hairy string, determination of the physical characteristics of the hair on the string, and cooling effect of hairy string diameter. The results derived through the conduction of those experiments are summarized below.

1. The water cooling rate of the hairy string heat exchanger increases by 15 percent compared with that of the non-hairy string heat exchanger.

2. The wet hairy strings are easily joined together due to narrower gaps provided by water held by hair on the strings so that the hairy strings are carefully kept apart from each other to prevent the touching with each other of the wet hair on the strings.

3. The cooling effect of the hairy strings due to amount of hair on the strings is higher for the hairy strings prepared with neither too much nor too little hair on the surface of the strings. This result comes from that the hairy strings are easy to join together because of shorter intervals created between the strings due to more water held over the much hairy string and that the little hairy string has smaller air cooling surface area created due to small amount of water held over little hairy string. In case of the hairy string 34 used for the STPs 2 of the present invention, the interval between adjacent surfaces of the water held over the hairy strings 34 is fixed in 10 mm which is larger than the intervals used in the experiment. Considering these summarized results, the fixed interval of 10 mm between edges of the adjacent holes 5 on the STPs pack 1 must be enough length to keep the hairy strings 34 apart from each other not to join together when the hairy strings 34 are used in the STPs pack 1 of the present invention.

Figure 16:
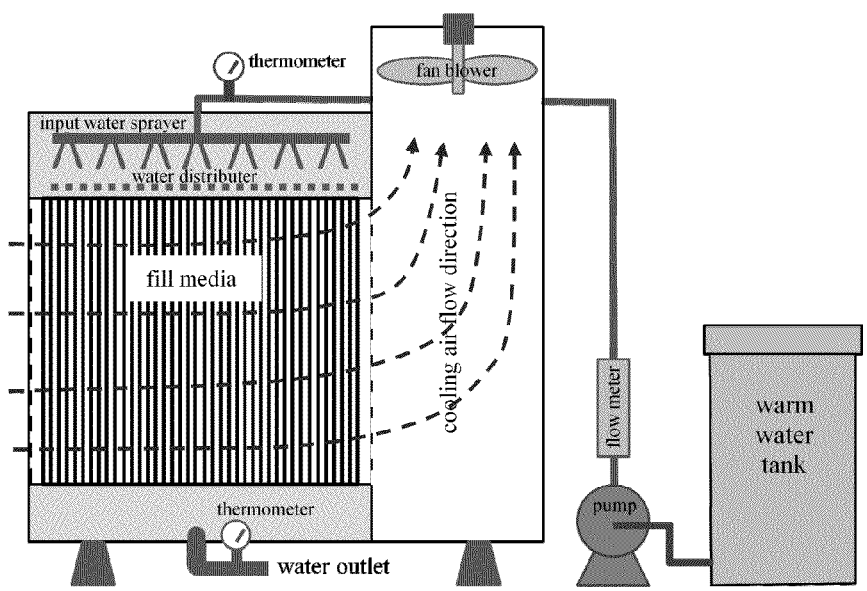
FIG. 16 illustrates the schematic experiment benchmarking a cross current cooling tower for performance test of STPs pack.

<Comparing Performance Tests and Cooling Efficiencies of STPs and PVCFs Packs in Case of Non-Hairy Strings> To evaluate water cooling efficiency of the STPs pack 1, one fourth of a small size of a currently operating cross current cooling tower was used as a benchmark. The benchmark cooling tower was a rectangular cross current cooling tower which had one fan blower at the center of the cooling tower and two PVCFs packs symmetrically located around the fan blower. So the benchmark cross current cooling tower used for performance test of the STPs packs 1 consisted of one cubic shape fills zone of 100(W)×100(D)×100(H)cm, one fan blower, and pump as shown in FIG. 16. The air blowing rate of the fan blower and the water flowing rate of the pump were 90 m³/min and 220 l/min, respectively. First, the operation of the experiment for performance tests of the PVCFs pack was conducted by placing the PVCFs pack in the fills zone of the benchmark experimental cooling tower and filling warm water in the warm water tank and then by putting the fan blower and water pump into operation. While the water was passing through the fill media and flowing out of the cooling tower through the water outlet, the flow meter and inlet and outlet water temperatures were read and recorded. After finishing the PVCFs pack's performance test, the PVCFs pack was replaced with STPs packs 1 and the warm water filled the water tank and then the operation of new performance test was conducted by following the same procedure as before and the water flow rate and temperatures were recorded as in the previous experiment. The results are tabulated in Table 1, which shows that the cooling efficiency of the STPs pack 1 of the

TABLE 1

Comparison of cooling efficiency of PVCFs pack and STPs pack in cross current cooling tower.

| Experimental Condition | Fill Media Fill Length | PVCFs pack 100 cm | | STPs pack 100 cm | |
|---|---|---|---|---|---|
| Room temp. 25° C. | Inlet temp.(° C.) | 44 | 58 | 42 | 56 |
| Air blowing rate 90 m³/min | Outlet temp.(° C.) | 34 | 42 | 29 | 38 |
| Water flowing rate 220 l/min | ΔT (° C.) | 10 | 16 | 13 | 18 |
| | Cooling efficiency (percent) | 23 | 27 | 31 | 32 | present invention was 31 percent, while 25 percent for the PVCFs Pack. Namely, the cooling efficiency of the STPs pack 1 of the present invention is higher than that of the PVCFs pack by 20 percent, which means that the size of the current PVCFs pack cooling tower can be reduced by 20 percent.

From the results of the performance tests of the non-hairy string 37 STPs pack 1 and PVCFs pack using the simulated cooling tower experiment and the cooling rate of the hairy strings 34 increased by 15 percent compared with that of the non-hairy strings 37 as described in Reference Cited 6 and 7, it can be concluded that if the hairy string 34 STPs packs 1 are used in the current PVCFs pack cooling tower, the size of the PVCFs pack cooling tower may be reduced by 35 percent which is obtained from straightforwardly combining the efficiency (20 percent) of the non-hairy string 37 STPs pack 1 against the PVCFs pack and that (15 percent) of hairy string 34 STPs pack 1 against the non-hairy string 37 STPs pack 1.

When installing the STPs pack 1 into fills zone of the cooling towers or replacing them, the STPs pack 1 should completely fill the fills zone of each layer with as little gap between the STPs packs 1 or the STPs pack 1 and wall of the fills zone as possible so as to avoid air by passing through such a gap. To solve this problem, the special STPs packs 1, adjusted the width of STPs smaller than standard to fit the gap, are inserted into the gap, resulting in providing wall to wall installation of the STPs packs 1 with minimum gap in the square or rectangular cooing tower with two side entrances of cooling air. In case of the square 53, pentagon 54, and hexagon cooling towers 56 with the entrance of the cooling air on their entire walls, the standard trapezoidal STPs packs 57, 58 are placed at the both sides of the trapezoidal shape fills zone and rectangular standard STPs pack 1 placed in its middle as shown in FIG. 15. When there is a gap in the middle, the special STPs packs described above are inserted to fill the gap. In addition, to fill the gaps in longitudinal direction of the fill packs, the special STPs packs fabricated with adjusted height of the STPs smaller than standard to fit the gap. In this way, the STPs packs 1 of the current invention can be loaded into new cooling towers or replace the current operating PVCFs packs to be retrofitted with minimal gap by installing STPs packs 1 from wall to wall of the fills zone.

<Conclusion Remarks> In conclusion, the string-thick-plates with vertical string screens on its both sides fabricated as described above using a long single string are joined together to form square columnar string-thick-plate packs by joining attachment tabs on frames of adjacent string-thick-plates together. Such fabrication methods of string-thick-plate and string-thick-plate pack require significantly less fabrication efforts and time, compared with the fabrication efforts and time of one-structure-string-fill-pack previously patented by the present inventor. Consequently, the application of the string-thick-plate packs can provide equivalent significant cost savings for the construction of cooling tower fills media due to reduction of fabrication efforts and time of a large string fill pack in one structure.

While the present invention has been described as having an exemplary design, this invention may be further modified within the concept and scope of this disclosure. This application is therefore intended to cover any variations, uses, or adaptations of the invention using its general principles. Further, this application is intended to cover such departures from the present disclosure as come within known or customary practice in the art to which this invention relates.

What is claimed is:

1. A string-thick-plates pack for use in a cooling tower, comprising:
    a multiplicity of string-thick-plates each having a pair of vertical-string-screens on both sides of said string-thick-plate, each of said vertical-string-screens having vertical-strings separated sufficiently apart from each other, wherein said vertical-strings pass through and over semi-circular holes on a frame of said string-thick-plate, referring to string-thick-plate frame;
    a plurality of attachment tabs on said string-thick-plate frame, each of said attachment tabs located on said string-thick-plate frame for joining adjacent string-thick-plates, whereby said attachment tabs are joined by aligning and inserting said attachment tabs into counterpart tabs of said adjacent string-thick-plate by pressing said attachment tabs into said counterpart tabs.

2. A string-thick-plates pack for use in a cooling tower, comprising:
    a multiplicity of string-thick-plates each having a pair of vertical-string-screens on both sides of said string-thick-plate, each of said vertical-string-screens having vertical-strings separated sufficiently apart from each other;
    a plurality of attachment tabs on a frame of said string-thick-plate, each of said attachment tabs located on said string-thick-plate frame for joining adjacent string-thick-plates, by aligning and inserting said attachment tabs into counterpart tabs of said adjacent string-thick-plate by pressing said attachment tabs into said counterpart tabs, said attachment tabs including male and female, said male attachment tabs positioned on one side of said string-thick-plate frame and said female attachment tabs on the other side.

3. A string-thick-plates pack as recited in claim 2, said vertical strings are formed from polyester string or hairy polyester string or spiral corrugated polyester string or spiral corrugated hairy polyester string.

4. A string-thick-plates pack for use in a cooling tower, comprising:
    a multiplicity of string-thick-plates each having a pair of vertical-string-screens on both sides of said string-thick-plate and a plurality of attachment tabs located on said string-thick-plate frame for joining adjacent string-thick-plates, wherein said string-thick-plates have rectangular frames each having top and bottom frames, and two side frames, said top and bottom and side frames supported with a triangular supporter inside of said top, bottom, and side frames.

5. The string-thick-plate as recited in claim 4, said rectangular frame having said top frame, bottom frame, and two side frames is formed by joining edges of each frame together or in one frame, wherein said rectangular frame is fabricated of aluminum or aluminum alloy or HDPE or polypropylene.

6. The string-thick-plate as recited in claim 4, wherein a plurality of male attachment tabs are placed on one side of said rectangular frame and female attachment tabs are placed on the other side of said frame and spaced substantially apart from each other, and wherein male and female piling tabs are both placed on edges of a surface of said top and bottom frames, respectively.

7. The string-thick-plate as recited in claim 4, wherein said top frame, bottom frame, and two side frames are formed in a thin square rod or tube or semi-tube and wherein semi-circular holes are placed on both sides of said top and bottom frame and spaced sufficiently apart from each other.

8. The string-thick-plates recited in claim 4, wherein surfaces of said top and bottom frames of said string-thick-plate frame are formed in rectangular or trapezoidal shape, wherein said string-thick-plate frame to be placed at an uppermost side of a trapezoidal fill zone may be formed in said trapezoidal.

9. A string-thick-plate pack for use in cooling towers as recited in claim 1, wherein said string-thick-plate packs are employed in rectangular, square, pentagon, and hexagon cooling towers, wherein said rectangular cooling tower has two fill zones of said string-thick-plate packs near to two entrances for cooling air, wherein said square cooling tower may have said string-thick-plate packs placed near to two side or four side wall entrances for cooling air, and wherein said string-thick-plate packs are placed near to the entrances of cooling air at the entire outside walls of said pentagon and hexagon cooling towers.

10. A string-thick-plates pack for use in cooling towers as recited in claim 1, wherein said string-thick-plate packs are employed in counter current cooling towers wherein said string-thick-plate packs are installed in shape of V-type fill media, and wherein said string-thick-plate packs are installed in shape of cross type fill media.

* * * * *